United States Patent [19]

Salomon et al.

[11] Patent Number: 5,294,982
[45] Date of Patent: Mar. 15, 1994

[54] METHOD AND APPARATUS FOR PROVIDING DUAL LANGUAGE CAPTIONING OF A TELEVISION PROGRAM

[75] Inventors: Amnon M. Salomon, Springfield, Va.; Anthony M. Faust, Mundelein, Ill.

[73] Assignee: National Captioning Institute, Inc., Falls Church, Va.

[21] Appl. No.: 813,021

[22] Filed: Dec. 24, 1991

[51] Int. Cl.[5] .............................................. H04N 7/087
[52] U.S. Cl. ..................................... 348/461; 348/476; 345/192
[58] Field of Search ............ 358/147, 142, 146; 340/750, 751, 748, 735, 732; H04N 7/08, 7/087

[56] References Cited

U.S. PATENT DOCUMENTS

| | | |
|---|---|---|
| 3,852,720 | 12/1974 | Park . |
| 4,187,031 | 2/1980 | Yeh et al. .............................. 400/83 |
| 4,228,507 | 10/1980 | Leban . |
| 4,490,789 | 12/1984 | Leban et al. . |
| 4,559,615 | 12/1985 | Goo et al. . |
| 4,670,841 | 6/1987 | Kostopoulos . |
| 4,692,865 | 9/1987 | Hsu . |
| 4,698,677 | 10/1987 | Kinghorn et al. . |
| 4,700,322 | 10/1992 | Benbassat et al. ............... 364/513.5 |
| 4,739,318 | 4/1988 | Cohen . |
| 4,860,378 | 8/1989 | Aoki et al. . |
| 4,879,653 | 11/1989 | Shinoto . |
| 4,951,302 | 8/1990 | Yan . |
| 4,954,955 | 9/1990 | Chiu . |
| 4,990,903 | 2/1991 | Cheng et al. . |
| 4,992,865 | 2/1991 | Park . |
| 4,993,764 | 2/1991 | Kinghorn . |
| 5,016,113 | 5/1991 | Yamashita et al. ................. 358/335 |
| 5,063,551 | 11/1991 | Yoshio et al. ......................... 369/48 |
| 5,124,694 | 6/1992 | Dien ................................... 340/750 |

FOREIGN PATENT DOCUMENTS

| | | |
|---|---|---|
| 0381807A2 | 8/1990 | European Pat. Off. . |
| 3134328A1 | 3/1983 | Fed. Rep. of Germany . |
| 0057915 | 5/1979 | Japan ................................... 340/750 |

OTHER PUBLICATIONS

Veith, Richard H. "Television's Teletext" North-Holland Elsevier Science Publishing Co. 1985 pp. 20–22, 95–102, 157–161.

A1-Norpak Corporation, Proposal for Character Set Extensions in Line 21 Caption System Standard, Jul. 9, 1992, pp. 1–8.

"Teletext Receiver A Circuit Design of the Sampling Clock Regeneration", Hirashima et al., IEEE, Aug. 1980.

World Telecommunication Forum, Franz Pilz, Oct. 6, 1975.

"Enhanced Graphics for Teletext/Viewdata", D. G. Clark, Philips Research Labs, circa 1978.

Han'gul (Korean Alphabet and Language), circa 1989.

Sections of 47 CFR from the Federal Register, circa 1976.

PBS Report 7709-C, Signal and Display specification, Lentz, circa 1980.

TeleCaption II (TM) decoder module performance specification, Nov., 1985.

Primary Examiner—James J. Groody
Assistant Examiner—David E. Harvey
Attorney, Agent, or Firm—Banner, Birch, McKie & Beckett

[57] ABSTRACT

A method of decoding data for a language having the Roman alphabet or a language having a syllabic alphabet from a composite video signal comprises the steps of receiving the data in the form of data packets and determining from bit values stored at particular bit positions whether the data is control data or represents printable character data comprising a head code or a tail code. Once it is determined that the data represents either a head code or a tail code of a printable character, the data bytes are valued for parity and, from that determination, a letter component is generated which points to a letter component or complete character for one or the other alphabet. Because characters of a syllabic language may be quite complex, the step of displaying the syllabic language character includes the steps of overlaying two or more letter components to form the syllabic character image. Furthermore, the syllabic language character is displayed having a height of approximately three quarters inch on a standard resolution NTSC signal television screen.

28 Claims, 29 Drawing Sheets

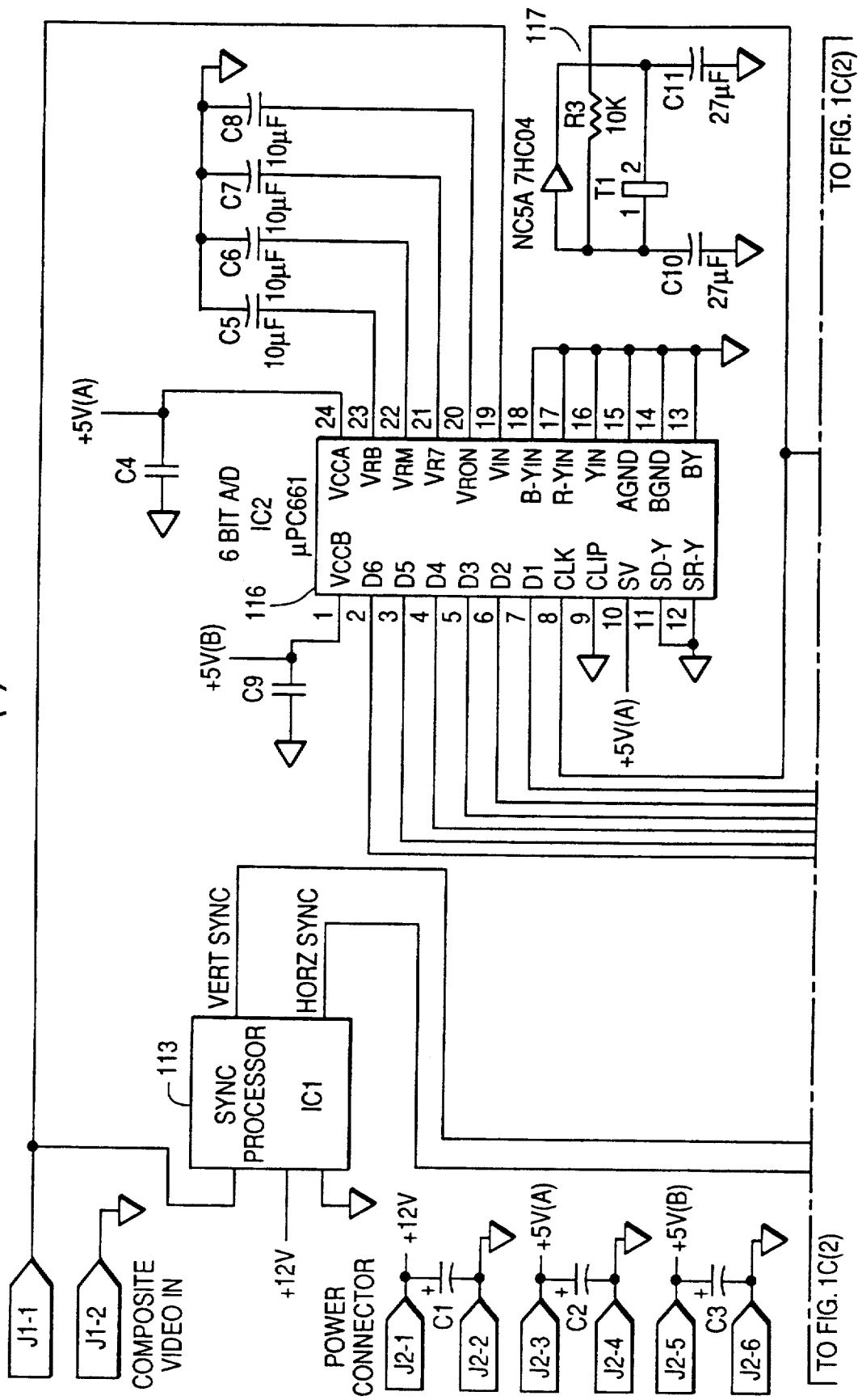
FIG. 1C(1)

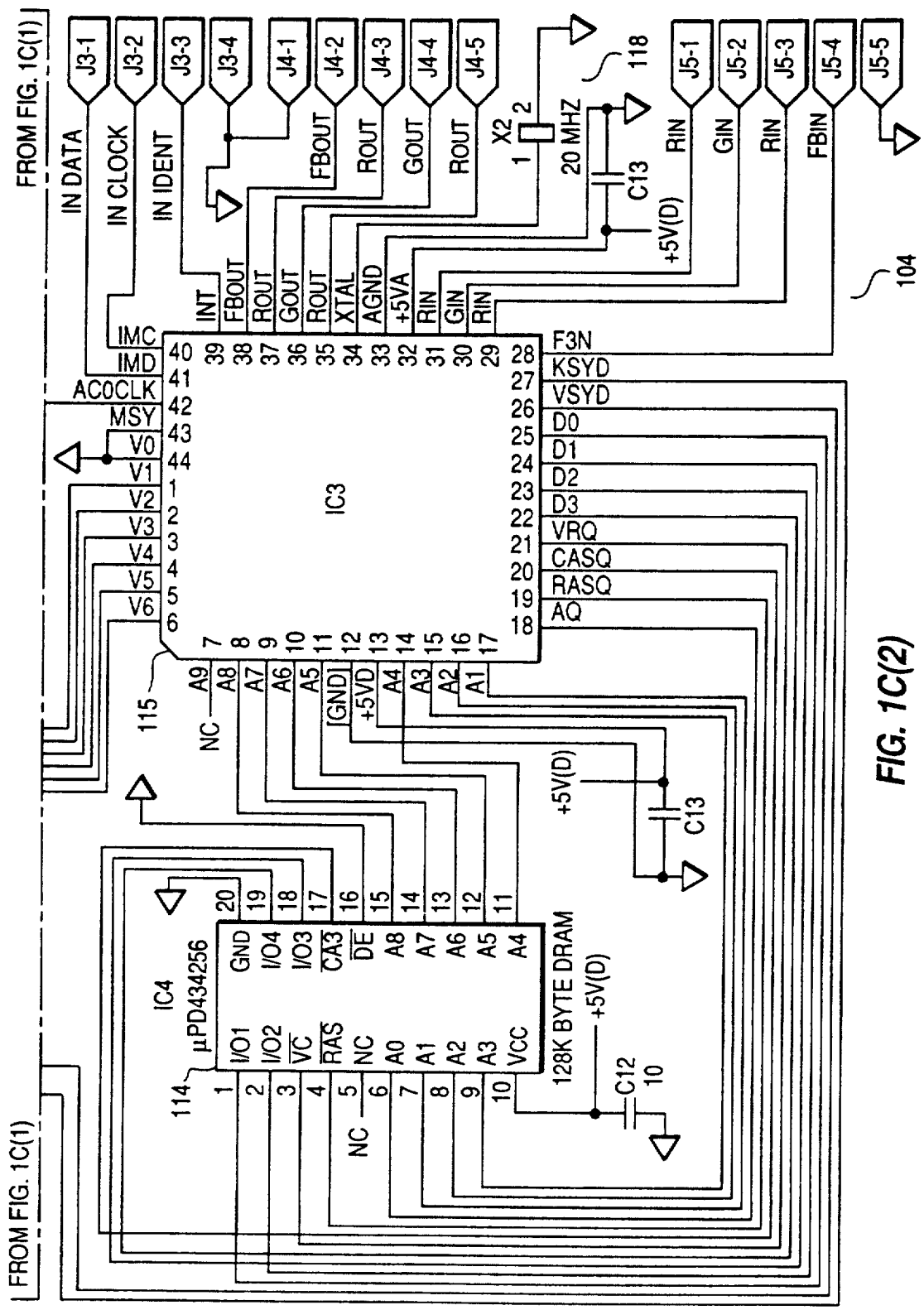
FIG. 1C(2)

FIG. 2B
CHARACTER SET

| B2 B1 B0 \ B6 B5 B4 B3 | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 000 | ¼ | â | | | ( | 0 | 8 | @ | H | P | X | ú | h | p | x |
| 001 | º | | | | ) | 1 | 9 | A | I | Q | Y | a | i | q | y |
| 010 | ½ | ê | | ! | á | 2 | : | B | J | R | Z | b | j | r | z |
| 011 | ¿ | ǎ | | " | + | 3 | ; | C | K | S | [ | c | k | s | Ç |
| 100 | ¾ | ě | | # | , | 4 | < | D | L | T | é | d | l | t | ÷ |
| 101 | ¢ | ǐ | | $ | - | 5 | = | E | M | U | j | e | m | u | Ñ |
| 110 | £ | ǒ | | ‰ | . | 6 | > | F | N | V | í | f | n | v | ñ |
| 111 | ₧ | ǔ | | & | / | 7 | ? | G | O | W | ó | g | o | w | ▒ |

FIG. 2C
MISCELLANEOUS CONTROL CODES

| DATA CHANNEL 1 | 2 | MNEMONIC | COMMAND DESCRIPTION |
|---|---|---|---|
| 14 20 | 1C 20 | RC | RESUME CAPTION LOADING |
| 14 21 | 1C 21 | BS | BACKSPACE |
| 14 22 | 1C 22 | AON | ALARM ON |
| 14 23 | 1C 23 | AOF | ALARM OFF |
| 14 25 | 1C 25 | RU2 | ROLL-UP CAPTIONS -- 2 ROWS |
| 14 26 | 1C 26 | RU3 | ROLL-UP CAPTIONS -- 3 ROWS |
| 14 27 | 1C 27 | RU4 | ROLL-UP CAPTIONS -- 4 ROWS |
| 14 28 | 1C 28 | FON | FLASH ON |
| 14 29 | 1C 29 | RDC | RESUME DIRECT CAPTIONING |
| 14 2A | 1C 2A | TR | TEXT RESTART |
| 14 2B | 1C 2B | RTD | RESUME TEXT DISPLAY |
| 14 2C | 1C 2C | EDM | ERASE DISPLAYED MEMORY |
| 14 2D | 1C 2D | CR | CARRIAGE RETURN |
| 14 2E | 1C 2E | ENM | ERASE NON-DISPLAYED MEMORY |
| 14 2F | 1C 2F | EOC | END OF CAPTION (FLIP MEMORIES) |

FIG. 2D

MID-ROW CODES

| DATA CHANNEL | | | | ATTRIBUTE DESCRIPTION |
|---|---|---|---|---|
| 1 | | 2 | | |
| 11 | 20 | 19 | 20 | WHITE |
| 11 | 21 | 19 | 21 | WHITE UNDERLINE |
| 11 | 22 | 19 | 22 | GREEN |
| 11 | 23 | 19 | 23 | GREEN UNDERLINE |
| 11 | 24 | 19 | 24 | BLUE |
| 11 | 25 | 19 | 25 | BLUE UNDERLINE |
| 11 | 26 | 19 | 26 | CYAN |
| 11 | 27 | 19 | 27 | CYAN UNDERLINE |
| 11 | 28 | 19 | 28 | RED |
| 11 | 29 | 19 | 29 | RED UNDERLINE |
| 11 | 2A | 19 | 2A | YELLOW |
| 11 | 2B | 19 | 2B | YELLOW UNDERLINE |
| 11 | 2C | 19 | 2C | MAGENTA |
| 11 | 2D | 19 | 2D | MAGENTA UNDERLINE |
| 11 | 2E | 19 | 2E | ITALICS |
| 11 | 2F | 19 | 2F | ITALICS UNDERLINE |

FIG. 2E

PREAMBLE ADDRESS CODES

| FIRST BYTE OF CODE PAIR | ROW 1 | ROW 2 | ROW 3 | ROW 4 | ROW 12 | ROW 13 | ROW 14 | ROW 15 |
|---|---|---|---|---|---|---|---|---|
| DATA CHANNEL 1 | 11 | 11 | 12 | 12 | 13 | 13 | 14 | 14 |
| DATA CHANNEL 2 | 19 | 19 | 1A | 1A | 1B | 1B | 1C | 1C |

| SECOND BYTE OF CODE PAIR | | | | | | | | |
|---|---|---|---|---|---|---|---|---|
| WHITE | 40 | 60 | 40 | 60 | 40 | 60 | 40 | 60 |
| WHITE UNDERLINE | 41 | 61 | 41 | 61 | 41 | 61 | 41 | 61 |
| GREEN | 42 | 62 | 42 | 62 | 42 | 62 | 42 | 62 |
| GREEN UNDERLINE | 43 | 63 | 43 | 63 | 43 | 63 | 43 | 63 |
| BLUE | 44 | 64 | 44 | 64 | 44 | 64 | 44 | 64 |
| BLUE UNDERLINE | 45 | 65 | 45 | 65 | 45 | 65 | 45 | 65 |
| CYAN | 46 | 66 | 46 | 66 | 46 | 66 | 46 | 66 |
| CYAN UNDERLINE | 47 | 67 | 47 | 67 | 47 | 67 | 47 | 67 |
| RED | 48 | 68 | 48 | 68 | 48 | 68 | 48 | 68 |
| RED UNDERLINE | 49 | 69 | 49 | 69 | 49 | 69 | 49 | 69 |
| YELLOW | 4A | 6A | 4A | 6A | 4A | 6A | 4A | 6A |
| YELLOW UNDERLINE | 4B | 6B | 4B | 6B | 4B | 6B | 4B | 6B |
| MAGENTA | 4C | 6C | 4C | 6C | 4C | 6C | 4C | 6C |
| MAGENTA UNDERLINE | 4D | 6D | 4D | 6D | 4D | 6D | 4D | 6D |
| WHITE ITALICS | 4E | 6E | 4E | 6E | 4E | 6E | 4E | 6E |
| WHITE ITALICS UNDERLINE | 4F | 6F | 4F | 6F | 4F | 6F | 4F | 6F |
| INDENT 0 | 50 | 70 | 50 | 70 | 50 | 70 | 50 | 70 |
| INDENT 0 UNDERLINE | 51 | 71 | 51 | 71 | 51 | 71 | 51 | 71 |
| INDENT 4 | 52 | 72 | 52 | 72 | 52 | 72 | 52 | 72 |
| INDENT 4 UNDERLINE | 53 | 73 | 53 | 73 | 53 | 73 | 53 | 73 |
| INDENT 8 | 54 | 74 | 54 | 74 | 54 | 74 | 54 | 74 |
| INDENT 8 UNDERLINE | 55 | 75 | 55 | 75 | 55 | 75 | 55 | 75 |
| INDENT 12 | 56 | 76 | 56 | 76 | 56 | 76 | 56 | 76 |
| INDENT 12 UNDERLINE | 57 | 77 | 57 | 77 | 57 | 77 | 57 | 77 |
| INDENT 16 | 58 | 78 | 58 | 78 | 58 | 78 | 58 | 78 |
| INDENT 16 UNDERLINE | 59 | 79 | 59 | 79 | 59 | 79 | 59 | 79 |
| INDENT 20 | 5A | 7A | 5A | 7A | 5A | 7A | 5A | 7A |
| INDENT 20 UNDERLINE | 5B | 7B | 5B | 7B | 5B | 7B | 5B | 7B |
| INDENT 24 | 5C | 7C | 5C | 7C | 5C | 7C | 5C | 7C |
| INDENT 24 UNDERLINE | 5D | 7D | 5D | 7D | 5D | 7D | 5D | 7D |
| INDENT 28 | 5E | 7E | 5E | 7E | 5E | 7E | 5E | 7E |
| INDENT 28 UNDERLINE | 5F | 7F | 5F | 7F | 5F | 7F | 5F | 7F |

NOTE: ALL INDENT CODES (SECOND BYTE EQUALS 50h-5Fh, 70h-7Fh) ASSIGN WHITE AS THE COLOR ATTRIBUTE.

KOREAN SYLLABLE CLOSED-CAPTION DATA

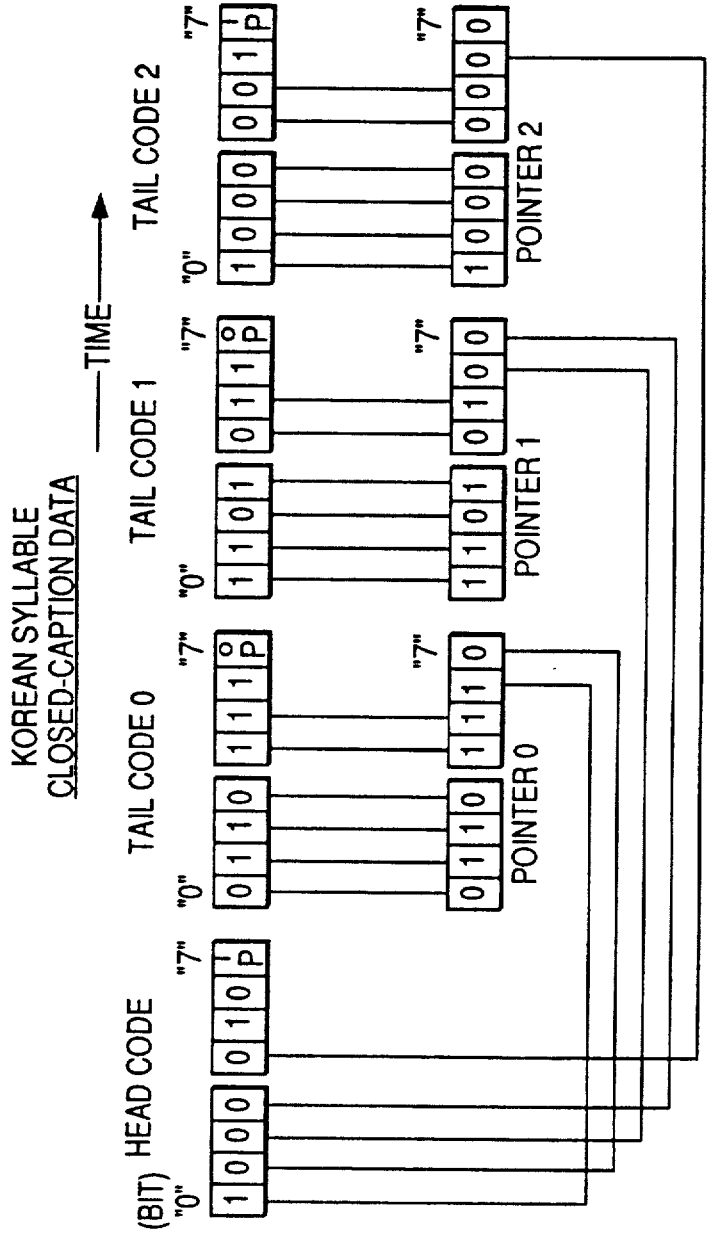

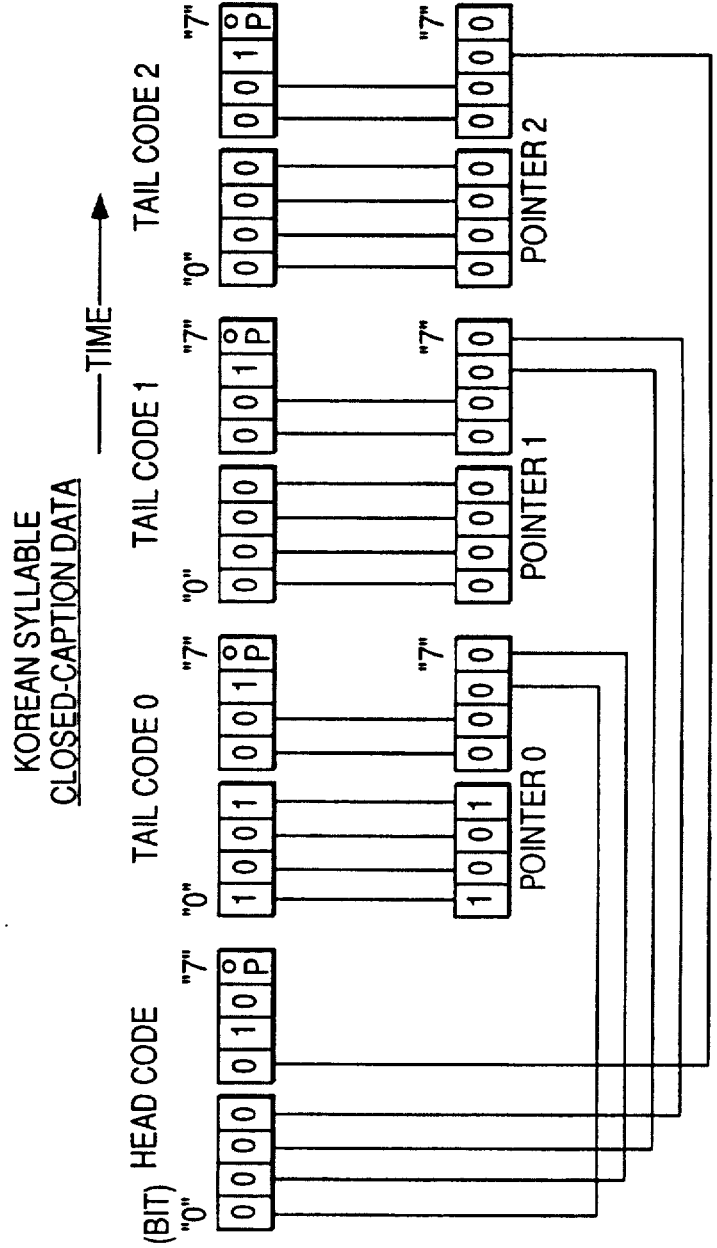

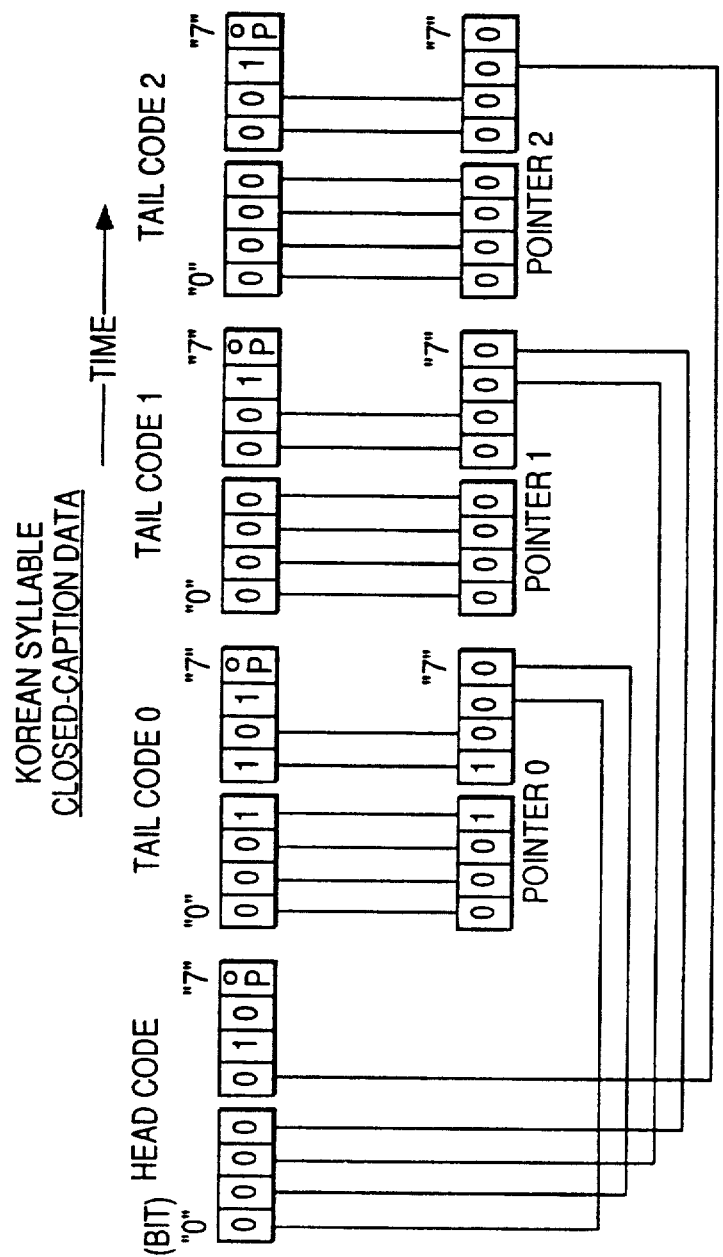

FIG. 4

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 1  | 하 | 러 | 이 | 겨 | 지 | 기 | 가 | 나 | 치 | 어 | 질 | 무 | 아 | 물 | 자 | 장 | 대 | 부 | 그 | 고 |
| 2  | 르 | 비 | 바 | 들 | 다 | 사 | 구 | 마 | 수 | 개 | 름 | 시 | 우 | 두 | 새 | 살 | 스 | 주 | 보 | 동 |
| 3  | 레 | 도 | 섯 | 링 | 미 | 내 | 불 | 랑 | 히 | 드 | 오 | 소 | 말 | 라 | 발 | 죽 | 러 | 배 | 글 | 근 |
| 4  | 머 | 달 | 실 | 매 | 망 | 조 | 작 | 니 | 모 | 음 | 집 | 풀 | 갈 | 래 | 굿 | 둥 | 돌 | 납 | 박 | 세 |
| 5  | 락 | 푸 | 버 | 은 | 손 | 귀 | 덕 | 별 | 풀 | 막 | 상 | 정 | 까 | 로 | 닥 | 금 | 앙 | 반 | 져 | 럽 |
| 6  | 울 | 더 | 걸 | 열 | 신 | 눈 | 감 | 목 | 먹 | 잡 | 설 | 꽃 | 떠 | 림 | 몽 | 뜨 | 여 | 으 | 당 | 럭 |
| 7  | 씨 | 독 | 차 | 골 | 한 | 추 | 노 | 일 | 제 | 속 | 쇠 | 맞 | 독 | 잘 | 세 | 팅 | 성 | 간 | 허 | 석 |
| 8  | 짝 | 뒤 | 슬 | 워 | 누 | 람 | 판 | 해 | 없 | 야 | 밥 | 갓 | 안 | 산 | 끼 | 계 | 중 | 앙 | 늘 | 피 |
| 9  | 등 | 전 | 잔 | 딱 | 꾸 | 각 | 덜 | 끈 | 망 | 샘 | 꼬 | 재 | 끈 | 만 | 쩨 | 외 | 파 | 길 | 심 | 타 |
| 10 | 물 | 움 | 신 | 창 | 디 | 느 | 초 | 재 | 팔 | 문 | 개 | 되 | 변 | 너 | 단 | 난 | 숙 | 쩍 | 진 | 짐 |
| 11 | 쭉 | 받 | 큰 | 째 | 건 | 탕 | 굴 | 쌔 | 밤 | 설 | 분 | 에 | 호 | 철 | 김 | 종 | 짓 | 암 | 때 | 술 |
| 12 | 데 | 푸 | 뒀 | 청 | 듬 | 메 | 깃 | 침 | 꺼 | 움 | 담 | 따 | 잠 | 밀 | 터 | 돈 | 입 | 샴 | 먹 | 참 |
| 13 | 둑 | 붙 | 명 | 끔 | 올 | 놀 | 북 | 요 | 끼 | 포 | 입 | 똥 | 격 | 려 | 겸 | 털 | 복 | 병 | 군 | 먼 |
| 14 | 론 | 톡 | 쥐 | 동 | 몰 | 필 | 뚝 | 족 | 짐 | 폭 | 독 | 긱 | 밭 | 몽 | 사 | 볼 | 쌀 | 잘 | 공 | 칠 |
| 15 | 태 | 쎄 | 토 | 송 | 해 | 콩 | 할 | 편 | 투 | 벼 | 후 | 붓 | 젓 | 솔 | 코 | 릿 | 웃 | 경 | 말 | 깔 |

THE THREE HUNDRED MOST COMMON SYLLABLES
© NATIONAL CAPTIONING INSTITUTE 1991

FIG. 5A

| TYPE | SIZE | START COORDI- NATE | NO. OF CHARAC- TERS | NO. OF NIBBLES / CHAR | TOTAL NO. BITS | | |
|------|-------|---------|-----|-----|-------|-----|-----|
| A | 6 x 16 | (0, 0) | 33 | 24 | 3168 | 1 | 33 |
| B | 10 x 10 | (0, 0) | 38 | 25 | 3800 | 34 | 71 |
| C | 6 x 10 | (0, 0) | 33 | 15 | 1980 | 72 | 104 |
| D | 6 x 14 | (0, 0) | 33 | 21 | 2772 | 105 | 137 |
| E | 10 x 8 | (0, 0) | 38 | 20 | 3040 | 138 | 175 |
| F | 6 x 8 | (0, 0) | 33 | 12 | 1584 | 176 | 208 |
| G | 5 x 16 | (5, 0) | 18 | 20 | 1440 | 209 | 226 |
| H | 10 x 10 | (0, 6) | 10 | 25 | 1000 | 227 | 236 |
| I | 10 x 16 | (0, 0) | 14 | 40 | 2240 | 237 | 250 |
| J | 6 x 10 | (4, 0) | 18 | 15 | 1080 | 251 | 268 |
| K | 10 x 6 | (0, 5) | 10 | 15 | 600 | 269 | 278 |
| L | 10 x 10 | (0, 0) | 7 | 25 | 700 | 279 | 285 |
| M | 10 x 6 | (0, 10) | 42 | 15 | 2520 | 286 | 327 |
| | | | 327 | | 25924 | | |

FIG. 6A

| INITIAL CONSONANTS IMAGES FOR TWO PART SYLLABLES REFERENCE BY VOWEL TYPE | | | | | | |
|---|---|---|---|---|---|---|
| VOWEL TYPE → | VERTICAL | | HORIZONTAL | | COMPLEX | |
| INITIAL CONSONANTS ↓ | ㅏ ㅑ ㅓ ㅕ ㅣ | ㅐ ㅒ ㅔ ㅖ | ㅗ ㅛ ㅡ | ㅜ ㅠ | ㅘ ㅙ ㅚ ㅢ | ㅝ ㅞ ㅟ |
| | A | A | B | B | C | C |
| ㄱ | 1 | 20 | 34 | 53 | 72 | 86 |
| ㅅ | 2 | 21 | 35 | 54 | 73 | 87 |
| ㅈ | 3 | 22 | 36 | 55 | 74 | 88 |
| ㅊ | 4 | 23 | 37 | 56 | 75 | 89 |
| ㅋ | 5 | 24 | 38 | 57 | 76 | 90 |
| ㄴ | 6 | 25 | 39 | 58 | 77 | 91 |
| ㄷ | 7 | 26 | 40 | 59 | 78 | 92 |
| ㄹ | 8 | 27 | 41 | 60 | 79 | 93 |
| ㅁ | 9 | 28 | 42 | 61 | 80 | 94 |
| ㅂ | 10 | 29 | 43 | 62 | 81 | 95 |
| ㅇ | 11 | 30 | 44 | 63 | 82 | 96 |
| ㅌ | 12 | 31 | 45 | 64 | 83 | 97 |
| ㅍ | 13 | 32 | 46 | 65 | 84 | 98 |
| ㅎ | 14 | 33 | 47 | 66 | 85 | 99 |
| ㄸ | 15 | ** | 48 | 67 | ** | 100 |
| ㅆ | 16 | ** | 49 | 68 | ** | 101 |
| ㄲ | 17 | ** | 50 | 69 | ** | 102 |
| ㅃ | 18 | ** | 51 | 70 | ** | 103 |
| ㅉ | 19 | ** | 52 | 71 | ** | 104 |
| WXL | 6 x 16 | 6 x 16 | 10 x 10 | 10 x 10 | 6 x 10 | 6 x 10 |
| STARTING COORDINATES | (0,0) | (0,0) | (0,0) | (0,0) | (0,0) | (0,0) |

© NATIONAL CAPTIONING INSTITUTE 1991

FIG. 6B

| INITIAL CONSONANTS IMAGES FOR THREE PART SYLLABLES REFERENCE BY VOWEL TYPE | | | | | | |
|---|---|---|---|---|---|---|
| VOWEL TYPE → | VERTICAL | | HORIZONTAL | | COMPLEX | |
| INITIAL CONSONANTS ↓ | ㅏ ㅑ ㅓ ㅕ ㅣ | ㅔ ㅖ ㅐ ㅒ | ㅗ ㅛ ㅡ | ㅜ ㅠ | ㅘ ㅙ ㅚ ㅢ | ㅝ ㅞ ㅟ |
| | D | D | E | E | F | F |
| ㄱ | 105 | 124 | 138 | 157 | 176 | 190 |
| ㅅ | 106 | 125 | 139 | 158 | 177 | 191 |
| ㅈ | 107 | 126 | 140 | 159 | 178 | 192 |
| ㅊ | 108 | 127 | 141 | 160 | 179 | 193 |
| ㅋ | 109 | 128 | 142 | 161 | 180 | 194 |
| ㄴ | 110 | 129 | 143 | 162 | 181 | 195 |
| ㄷ | 111 | 130 | 144 | 163 | 182 | 196 |
| ㄹ | 112 | 131 | 145 | 164 | 183 | 197 |
| ㅁ | 113 | 132 | 146 | 165 | 184 | 198 |
| ㅂ | 114 | 133 | 147 | 166 | 185 | 199 |
| ㅇ | 115 | 134 | 148 | 167 | 186 | 200 |
| ㅌ | 116 | 135 | 149 | 168 | 187 | 201 |
| ㅍ | 117 | 136 | 150 | 169 | 188 | 202 |
| ㅎ | 118 | 137 | 151 | 170 | 189 | 203 |
| ㄸ | 119 | ** | 152 | 171 | ** | 204 |
| ㅆ | 120 | ** | 153 | 172 | ** | 205 |
| ㄲ | 121 | ** | 154 | 173 | ** | 206 |
| ㅃ | 122 | ** | 155 | 174 | ** | 207 |
| ㅉ | 123 | ** | 156 | 175 | ** | 208 |
| WXL | 6 x 14 | 6 x 14 | 10 x 8 | 10 x 8 | 6 x 8 | 6 x 8 |
| STARTING COORDINATES | (0,0) | (0,0) | (0,0) | (0,0) | (0,0) | (0,0) |

© NATIONAL CAPTIONING INSTITUTE 1991

FIG. 6C

| INITIAL CONSONANT → <br><br> VOWELS ↓ | ㄱㅅㅈㅊ<br>ㅋㄴㄷㄹ<br>ㅁㅂㅇㅌ<br>ㅍㅎ | ㄸㅆㄲㅃㅉ | ㄱㅅㅈㅊ<br>ㅋ | ㄴㄷㄹㅁ<br>ㅂㅇㅌㅍ<br>ㅎㄸㄲㅆ<br>ㅃㅉ | ㄱㅅㅈㅊ<br>ㅋㄴㄷㄹ<br>ㅁㅂㅇㅌ<br>ㅍㅎ | ㄸㅆㄲㅃㅉ |
|---|---|---|---|---|---|---|
| | G | G | H | H | I | I |
| VERTICAL ㅏ | 209 | 218 | ••• | ••• | ••• | ••• |
| ㅑ | 210 | 219 | ••• | ••• | ••• | ••• |
| ㅓ | 211 | 220 | ••• | ••• | ••• | ••• |
| ㅕ | 212 | 222 | ••• | ••• | ••• | ••• |
| ㅣ | 213 | 221 | ••• | ••• | ••• | ••• |
| ㅐ | 214 | 223 | ••• | ••• | ••• | ••• |
| ㅒ | 215 | 224 | ••• | ••• | ••• | ••• |
| ㅔ | 216 | 225 | ••• | ••• | ••• | ••• |
| ㅖ | 217 | 226 | ••• | ••• | ••• | ••• |
| HORIZONTAL ㅗ | ••• | ••• | 227 | 232 | ••• | ••• |
| ㅛ | ••• | ••• | 228 | 233 | ••• | ••• |
| ㅡ | ••• | ••• | 229 | 234 | ••• | ••• |
| ㅜ | ••• | ••• | 230 | 235 | ••• | ••• |
| ㅠ | ••• | ••• | 231 | 236 | ••• | ••• |
| COMPLEX ㅘ | ••• | ••• | ••• | ••• | 237 | 244 |
| ㅙ | ••• | ••• | ••• | ••• | 238 | 245 |
| ㅚ | ••• | ••• | ••• | ••• | 239 | 246 |
| ㅢ | ••• | ••• | ••• | ••• | 240 | 247 |
| ㅝ | ••• | ••• | ••• | ••• | 241 | 248 |
| ㅞ | ••• | ••• | ••• | ••• | 242 | 249 |
| ㅟ | ••• | ••• | ••• | ••• | 243 | 250 |
| WXL | 5 x 16 | 5 x 16 | 10 x 10 | 10 x 10 | 10 x 16 | 10 x 16 |
| STARTING COORDINATES | (5,0) | (5,0) | (0,6) | (0,6) | (0,0) | (0,0) |

TWO PART SYLLABLES VOWELS REFERENCE BY INITIAL CONSONANTS GROUPS

© NATIONAL CAPTIONING INSTITUTE 1991

FIG. 6D

| THREE PART SYLLABLES VOWELS REFERENCE BY INITIAL CONSONANTS GROUPS ||||||
|---|---|---|---|---|---|
| INITIAL CONSONANT → <br><br> VOWELS ↓ | ㄱㅅㅈㅊㅋㅌㅍㅎ <br> ㄲㄴㄷㄹㅁㅂㅇㅌ <br> (partial) | ㄸㅆㄲㅃㅉ | ㄱㅅㅈㅊㅋ | ㄴㄷㄹㅁㅂㅅㅇㅎㅌㅍ ㄲㄸㄴㅃㅉㅆ | (ALL) |
| | J | J | K | K | L |
| ㅏ (VERTICAL) | 251 | 260 | ... | ... | ... |
| ㅑ | 252 | 261 | ... | ... | ... |
| ㅓ | 253 | 262 | ... | ... | ... |
| ㅕ | 254 | 263 | ... | ... | ... |
| ㅣ | 255 | 264 | ... | ... | ... |
| ㅐ | 256 | 265 | ... | ... | ... |
| ㅒ | 257 | 266 | ... | ... | ... |
| ㅔ | 258 | 267 | ... | ... | ... |
| ㅖ | 259 | 268 | ... | ... | ... |
| ㅗ (HORIZONTAL) | ... | ... | 269 | 274 | ... |
| ㅛ | ... | ... | 270 | 275 | ... |
| ㅡ | ... | ... | 271 | 276 | ... |
| ㅜ | ... | ... | 272 | 277 | ... |
| ㅠ | ... | ... | 273 | 278 | ... |
| ㅘ (COMPLEX) | ... | ... | ... | ... | 279 |
| ㅝ | ... | ... | ... | ... | 280 |
| ㅚ | ... | ... | ... | ... | 281 |
| ㅢ | ... | ... | ... | ... | 282 |
| ㅙ | ... | ... | ... | ... | 283 |
| ㅞ | ... | ... | ... | ... | 284 |
| ㅟ | ... | ... | ... | ... | 285 |
| WXL | 6 x 10 | 6 x 10 | 10 x 6 | 10 x 6 | 10 x 10 |
| STARTING COORDINATES | (4,0) | (4,0) | (0,5) | (0,5) | (0,0) |

© NATIONAL CAPTIONING INSTITUTE 1991

FIG. 6E

| FINAL CONSONANTS IMAGES FOR THREE PART SYLLABLES REFERENCE BY VOWEL TYPE | | | | | | |
|---|---|---|---|---|---|---|
| VOWEL TYPE → <br><br> FINAL CONSO-<br>NANTS ↓ | VERTICAL <br><br> ㅏ ㅑ ㅓ ㅕ <br> ㅣ ㅐ ㅒ ㅖ <br> ㅔ | HORI-<br>ZONTAL &<br>COMPLEX <br><br> ㅗ ㅛ ㅡ <br> ㅜ ㅠ ㅢ <br> ㅘ ㅝ ㅞ <br> ㅚ | VOWEL TYPE → <br><br> FINAL CONSO-<br>NANTS ↓ | VERTICAL <br><br> ㅏ ㅑ ㅓ ㅕ <br> ㅣ ㅐ ㅒ ㅖ <br> ㅔ | HORI-<br>ZONTAL &<br>COMPLEX <br><br> ㅗ ㅛ ㅡ <br> ㅜ ㅠ ㅢ <br> ㅘ ㅝ ㅞ <br> ㅚ |
| | M | M | | M | M |
| ㄴ | 286 | 313 | ㅆ | 300 | 327 |
| ㅅ | 287 | 314 | ㄲ | 301 | ... |
| ㄱ | 288 | 315 | ㄳ | 302 | ... |
| ㄷ | 289 | 316 | ㄵ | 303 | ... |
| ㄹ | 290 | 317 | ㄶ | 304 | ... |
| ㅁ | 291 | 318 | ㄺ | 305 | ... |
| ㅂ | 292 | 319 | ㄻ | 306 | ... |
| ㅇ | 293 | 320 | ㄼ | 307 | ... |
| ㅈ | 294 | 321 | ㄽ | 308 | ... |
| ㅊ | 295 | 322 | ㄾ | 309 | ... |
| ㅋ | 296 | 323 | ㄿ | 310 | ... |
| ㅌ | 297 | 324 | ㅀ | 311 | ... |
| ㅍ | 298 | 325 | ㅄ | 312 | ... |
| ㅎ | 299 | 326 | | | |
| WXL | 10 x 6 | 10 x 6 | WXL | 10 x 6 | 10 x 6 |
| STARTING COORDINATE | (0,10) | (0,10) | | (0,10) | (0,10) |

© NATIONAL CAPTIONING INSTITUTE 1991

FIG. 7A

|    | 01 | 02 | 03 | 04 | 05 | 06 | 07 | 08 | 09 | 0A | 0B | 0C | 0D | 0E | 0F | 10 |
|----|----|----|----|----|----|----|----|----|----|----|----|----|----|----|----|----|
| 00 | ㄱ | ㅅ | ㅈ | ㅊ | ㅋ | ㄴ | ㄷ | ㄹ | ㅁ | ㅂ | ㅇ | ㅌ | ㅍ | ㅎ | ㄸ | ㅆ |
| 10 | ㄲ | ㅃ | ㅉ | ㄱ | ㅅ | ㅈ | ㅊ | ㅋ | ㄴ | ㄷ | ㄹ | ㅁ | ㅂ | ㅇ | ㅌ | ㅍ |
| 20 | ㅎ | ㄱ | ㅅ | ㅈ | ㅊ | ㅋ | ㄴ | ㄷ | ㄹ | ㅁ | ㅂ | ㅇ | ㅌ | ㅍ | ㅎ | ㄸ |
| 30 | ㅆ | ㄲ | ㅃ | ㅉ | ㄱ | ㅅ | ㅈ | ㅊ | ㅋ | ㄴ | ㄷ | ㄹ | ㅁ | ㅂ | ㅇ | ㅌ |
| 40 | ㅍ | ㅎ | ㄸ | ㅆ | ㄲ | ㅃ | ㅉ | ㄱ | ㅅ | ㅈ | ㅊ | ㅋ | ㄴ | ㄷ | ㄹ | ㅁ |
| 50 | ㅂ | ㅇ | ㅌ | ㅍ | ㅎ | ㄱ | ㅅ | ㅈ | ㅊ | ㅋ | ㄴ | ㄷ | ㄹ | ㅁ | ㅂ | ㅇ |
| 60 | ㅌ | ㅍ | ㅎ | ㄸ | ㅆ | ㄲ | ㅃ | ㅉ | ㄱ | ㅅ | ㅈ | ㅊ | ㅋ | ㄴ | ㄷ | ㄹ |
| 70 | ㅁ | ㅂ | ㅇ | ㅌ | ㅍ | ㅎ | ㄸ | ㅆ | ㄲ | ㅃ | ㅉ | ㄱ | ㅅ | ㅈ | ㅊ | ㅋ |
| 80 | ㄴ | ㄷ | ㄹ | ㅁ | ㅂ | ㅇ | ㅌ | ㅍ | ㅎ | ㄱ | ㅅ | ㅈ | ㅊ | ㅋ | ㄴ | ㄷ |
| 90 | ㄹ | ㅁ | ㅂ | ㅇ | ㅌ | ㅍ | ㅎ | ㄸ | ㅆ | ㄲ | ㅃ | ㅉ | ㄱ | ㅅ | ㅈ | ㅊ |
| A0 | ㅋ | ㄴ | ㄷ | ㄹ | ㅁ | ㅂ | ㅇ | ㅌ | ㅍ | ㅎ | ㄸ | ㅆ | ㄲ | ㅃ | ㅉ | ㄱ |
| B0 | ㅅ | ㅈ | ㅊ | ㅋ | ㄴ | ㄷ | ㄹ | ㅁ | ㅂ | ㅇ | ㅌ | ㅍ | ㅎ | ㄱ | ㅅ | ㅈ |
| C0 | ㅊ | ㅋ | ㄴ | ㄷ | ㄹ | ㅁ | ㅂ | ㅇ | ㅌ | ㅍ | ㅎ | ㄸ | ㅆ | ㄲ | ㅃ | ㅉ |

1ST POINTER p o

© NATIONAL CAPTIONING INSTITUTE 1991

FIG. 7B

```
   01 02 03 04 05 06 07 08 09 0A 0B 0C 0D 0E 0F 10
00  ㅏ ㅑ ㅓ ㅕ ㅣ ㅐ ㅒ ㅔ ㅖ ㅏ ㅏ ㅓ ㅕ ㅣ ㅐ ㅒ        2ND
10  ㅔ ㅖ ㅗ ㅛ ㅡ ㅜ ㅠ ㅗ ㅛ ㅡ ㅜ ㅠ ㅘ ㅙ ㅚ ㅢ        POINTER
20  ㅟ ㅞ ㅝ ㅘ ㅙ ㅚ ㅢ ㅝ ㅞ ㅟ ㅏ ㅑ ㅓ ㅕ ㅣ ㅐ           1
30  ㅒ ㅔ ㅖ ㅏ ㅑ ㅓ ㅕ ㅣ ㅐ ㅒ ㅔ ㅖ ㅗ ㅛ ㅡ ㅜ
40  ㅠ ㅗ ㅛ ㅡ ㅜ ㅠ ㅘ ㅙ ㅚ ㅢ ㅝ ㅞ ㅟ
```

© NATIONAL CAPTIONING INSTITUTE 1991

FIG. 7C

```
   01 02 03 04 05 06 07 08 09 0A 0B 0C 0D 0E 0F 10
00  ㄴ ㅅ ㄱ ㄷ ㄹ ㅁ ㅂ ㅇ ㅈ ㅊ ㅋ ㅌ ㅍ ㅎ ㅆ ㄲ        3RD
10  ㄳ ㄵ ㄶ ㄺ ㄻ ㄼ ㄽ ㄾ ㄿ ㅀ ㅄ ㄴ ㅅ ㄱ ㄷ ㄹ        POINTER
20  ㅁ ㅂ ㅇ ㅈ ㅊ ㅋ ㅌ ㅍ ㅎ ㅆ                              2
```

© NATIONAL CAPTIONING INSTITUTE 1991

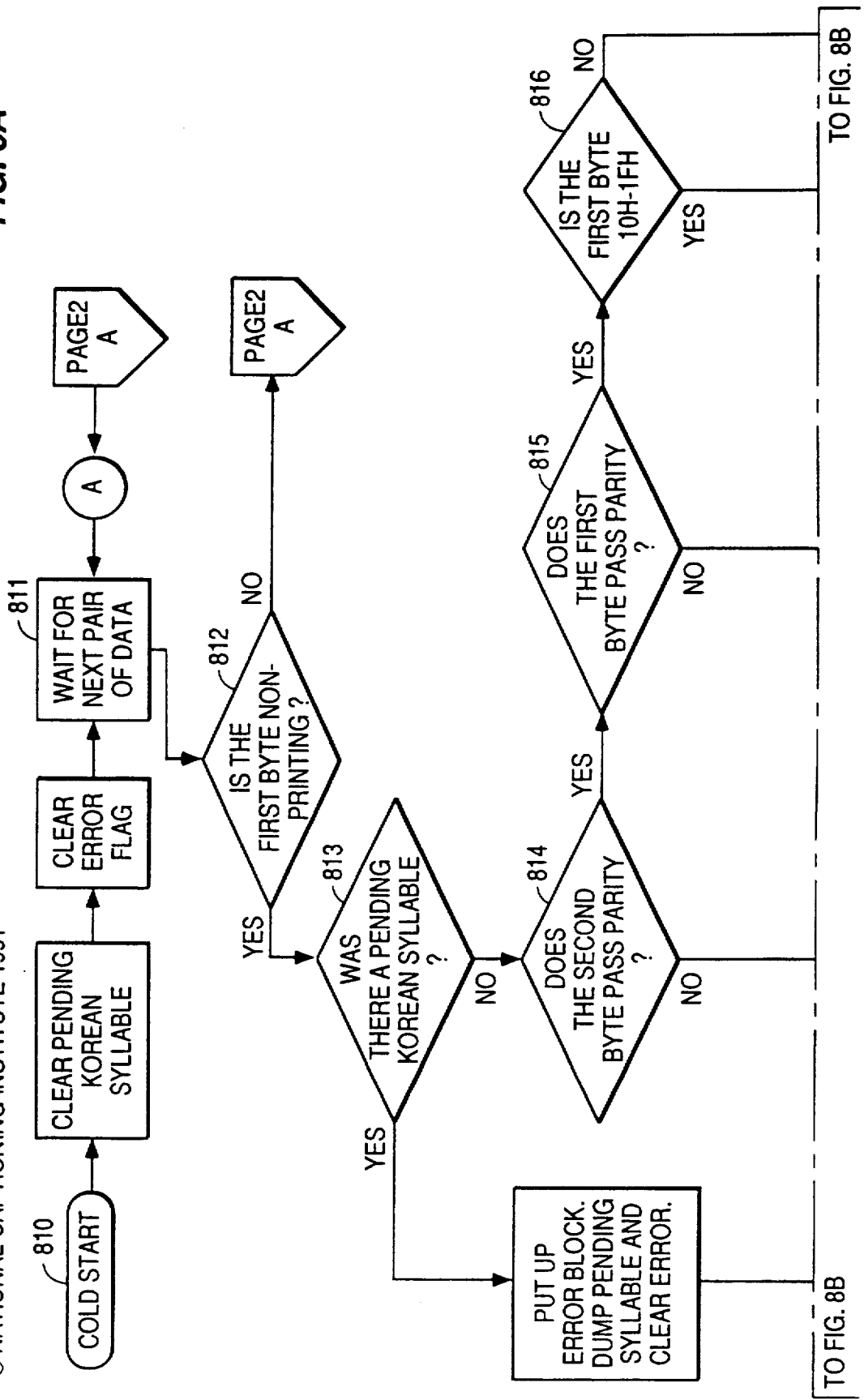

FIG. 9

SINCE 138 IS TYPE E IMAGE IS 10x8 AND BEGINS AT (0,0)
NUMBER OF NIBBLES = 20
NIBBLE 0 = 0   ⇨   . . . .
NIBBLE 1 = 0   ⇨   . . . .
NIBBLE 2 = 0   ⇨   . . . .
NIBBLE 3 = 0   ⇨   . . . .
NIBBLE 4 = 1   ⇨   X . . .
NIBBLE 5 = 0   ⇨   . . . .
NIBBLE 6 = 1   ⇨   X . . .
NIBBLE 7 = 0   ⇨   . . . .
NIBBLE 8 = 0   ⇨   X . . .
NIBBLE 9 = 1   ⇨   . . . .
NIBBLE 10 = 1  ⇨   X . . .
NIBBLE 11 = 0  ⇨   . . . .
NIBBLE 12 = F  ⇨   XXXX
NIBBLE 13 = 3  ⇨   XX . .
NIBBLE 14 = 0  ⇨   . . . .
NIBBLE 15 = 0  ⇨   . . . .
NIBBLE 16 = 0  ⇨   . . . .
NIBBLE 17 = 0  ⇨   . . . .
NIBBLE 18 = 0  ⇨   . . . .
NIBBLE 19 = 0  ⇨   . . . .

THIS PRODUCES

. . X X X X X . . .
. . . . . . X . . .
. . . . . . X . . .
. . . . . . X . . .
. . . . . . X . . .
. . . . . . X . . .
. . . . . . . . . .
. . . . . . . . . .

METHOD AND APPARATUS FOR PROVIDING DUAL LANGUAGE CAPTIONING OF A TELEVISION PROGRAM

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Technical Field

The present invention relates to the field of producing closed captioning for television program viewers who are deaf or hard-of-hearing, and more particularly to a method and apparatus for providing closed captioning in two languages, the first language using the Roman alphabet and the second language using a syllabic alphabet, as will be more particularly defined herein.

2. Description of Relevant Art

Closed captioning is the method by which the audio portion of a television program or home video is processed into recorded words that can be displayed on a television screen with the aid of circuitry contained in an external device known as a captioning decoder or related decoder circuitry built into a television receiver. One known decoder commercially available through the National Captioning Institute of Falls Church, Va. is the TeleCaption (TM) 4000 decoder.

The purpose of the decoder is to receive encoded captioning data transmitted at a particular line of the vertical blanking interval of a standard television signal which may be used for data transmission. This line may be any of lines 10 through 21 of the vertical blanking interval of a known standard television signal format adapted for use in the United States. In accordance with United States standard National Television SubCommittee (NTSC) format as described at 47 Code of Federal Regulations (CFR) Section 73.682 (a)(22), the chosen data transmission line is line 21, which is immediately adjacent to active video. In one higher resolution European standard television broadcast signal, the chosen line is line 16 or line 329 of the vertical blanking interval, in another, line 22 or line 335.

Particular details of specifications for a decoder have been published by the Federal Communications Commission on Jun. 13, 1991 at 47 CFR section 15.119 through the Federal Register, to become effective Jul. 15, 1991. There is provided a transmission and encoding scheme for transmitting special characters such as musical notes, the Roman alphabet, punctuation, attributes, control codes and such in hexadecimal format. The special character set further includes alphabet characters, for example, having a grave accent so that European languages such as French or Spanish may be transmitted. The decoder decodes the captioning and control code data transmitted on line 21 in accordance with the published format. The decoder includes memory for looking up a stored character set and causes a display of closed captioned text on a television screen simultaneously with the image of the person speaking the text.

An overall block schematic diagram for the TeleCaption 4000 decoder is shown as prior art FIG. 1A. A broadcast television signal is received at a television tuner 101 selectively actuated by a controller 103, preferably a microprocessor, to tune to a selected television channel. In particular, controller 103 may be a Motorola 6805P6 microprocessor, part no. F24K189 or comparable microprocessor known in the art. The tuner 101 is actuated under user control, preferably by channel up and channel down key or other input device input (not shown). The received television signal is demodulated from the selected channel frequency and the audio and video carriers at baseband separated at the television tuner 101. The audio signal is provided to a volume control circuit 102 and the video to a close-caption processor 104, both under control of the controller circuit 103. Audio preferably may be regulated under user control via a user input device (not shown), for example, via up and down volume keys. Regulated audio at a desired volume level is provided from the volume control circuit 102 to a channel ¾ modulator 105. At the same time, the close-caption processor 104 extracts the textual and command control data including caption data representative of the audio transmission and outputs an overlaid video signal including captions to the channel ¾ modulator 105. The close-caption processor 104 most conveniently comprises a Sierra NC74021 application specific integrated circuit, available from the National Captioning Institute, and a microprocessor, for example, a Motorola 6803 custom mask SC93193P controller, also available from the National Captioning Institute. Further details of one closed caption processor comprising these two integrated circuits are provided in FIG. 1B. The channel ¾ modulator 105, preset to one or the other of channels 3 or 4, modulates the combined video and audio signal to the selected frequency. The output of the channel ¾ modulator 105 is then provided to an associated television set (not shown), which if tuned to the preset channel 3 or 4, will display the output of the caption decoder of FIG. 1A.

A schematic circuit diagram of the close-caption processor 104 or decoder section of FIG. 1A is represented as FIG. 1B. The received baseband video signal is provided to a close-caption overlay circuit 112, to a close-caption timing circuit 106 and to a data extractor 107. The close-caption timing circuit 106 regards the input video signal to determine the location of the vertical blanking interval, the identity of the received field, be it odd or even, and determines the starting point of the selected line, for example, line 21 for the identified field. The close-caption timing circuit 106, operating at sub-line frequency, also generally clocks all the operations of the principal building block circuits of the decoder circuitry. For example, the close-caption timing circuit 106 clocks and signals the data extractor circuit 107 to extract the data received at the selected line.

Referring briefly to FIG. 2A, typically, a clock run in burst is used to obtain a half power value for data slicing and the data extractor 107, clocked by the timing circuit 106 extracts a serial data stream comprising two data bytes at a time and forwards the extracted data to controller 109. At the same time, the close-caption timing circuit 106 clocks and signals the attribute register circuit 108 when to begin to store attribute data for an output caption to be generated and eventually overlaid on the incoming video signal via the close-caption overlay circuit 112. The close-caption timing circuit 106 also clocks and signals the close-caption controller 109, which most conveniently comprises a microprocessor, to accept data from the data extractor circuit 107. Also, the close-caption timing circuit 106 clocks the display RAM circuit 110 as it receives temporary data from the close caption controller 109, outputs attribute data to the attribute register and pointer data to a character ROM 111, also clocked by the close-caption timing circuit 106.

Pointer data output from the display RAM 110 points uniquely to a permanently stored character set stored in the character ROM circuit 111. The attribute register circuit 108 further provides attribute data to the character ROM 111 for characters. In a caption mode of operation, attributes, for example, may be related to style, whether or not the character is to blink or to appear in a particular color. Attribute data provided to the close-caption overlay circuit 112 relates to attributes for an entire overlay or caption. In this manner, an entire caption is generated for display on an associated television set which may be rolled-up (scrolled), popped-on (displayed all at one time), or painted-on (displayed in a continuously printing manner).

If a caption is to be printed in italics, the closed caption timing circuit 106 is signalled by the closed caption controller responsive, for example, to receipt of a mid-row italics code to output timing signals to generate pointer data output from display RAM 110. However, closed caption timing circuit 106 outputs clocking signals at a different rate to character ROM 111 in such manner that the output character data of character ROM 111 is intentionally slanted to appear in italics.

An application specific integrated circuit (ASIC) for performing the decoding of teletext signals transmitted with a television signal is available from ITT Corporation and is commercially known as the Teletext Processing Unit (TPU) 2740, a 24 pin ASIC. This chip also generates English teletext characters for display as a teletext television image, typically a static image of textual data. Teletext is a service provided, for example, over broadcast television channels, cable television channels or through direct broadcast satellite systems, and while not related specifically to closed captioning, relates to a method of providing textual information which may be superimposed on an action image or a plain background.

Data required for closed captioning requires both textual or captioning data and display command data for, for example, synchronizing the caption data with the spoken dialogue of a television program. Thus, a caption decoder includes circuitry which additionally decodes display command data to display a caption at the bottom of a television image.

Captioned television thus enables viewers to read the dialogue and narration of programs. Closed captioning provides access to the entertainment, educational and informational benefits of television for viewers who are deaf or hard-of-hearing. When the spoken word is in a foreign language and sub-titles in a native tongue are provided, people learning the foreign language can enjoy the benefits of such captioned television as well.

Known decoders generally comprise a character generator as per FIG. 1B or similar circuitry which causes captions to appear in the lower portion of the television screen, below the video image of the speaker. As already described, the character generator may also be built into an associated television set. The video information appearing on the horizontal lines of the caption image are appropriately replaced with character data output by the character generator, for example, via closed caption overlay circuit 112. Character sizes vary proportionately to the size of the television screen. On a nineteen inch screen, for instance, captions appear to be about one half inch high. The captions are easily visible—typically white letters against a black background. Appearing at the bottom of the picture, captions typically do not obstruct one's view of the action portion of the video program image, that is, that portion of the image where the normal viewer, without captioning, would focus their attention in order to enjoy the displayed image.

Closed captioning technology was developed by the Public Broadcasting Service (PBS) during the period 1973-1979. Numerous over-the-air test transmissions were conducted to test all aspects of the caption generation including encoding, decoding, and the display of captions. Service was launched in March of 1980 by the then newly created National Captioning Institute in cooperation with the television networks. The original target audience for captioning included people who were deaf or hard-of-hearing (about 20 million people), but now includes people learning English as a second language and those learning to read, such as students with learning disabilities. Weekly availability in the United States of captioned programs now exceeds 400 hours between network TV, cable television and syndicated programs.

For encoding according to NTSC and Federal Communications Commissions Standards, broadcasters may obtain a model EN230 or smart encoder manufactured by E.E.G. Enterprises, Inc. of Farmingdale, N.Y. This same company manufactures a model EN210 or simple encoder as well. The encoder inserts caption data into fields one and two at line 21 of the vertical blanking interval. A so-called smart encoder receives data to be inserted through an RS232 serial data port. The smart encoder, having a built-in decoder, can recognize gaps in caption data and can fill the gaps with additional caption or text service data. For example, if already existent captioning data appears at line 21 but there exists a capacity to display up to fifteen rows of thirty-two characters, there is spare capacity for additional captions or text services. These text services may comprise emergency announcements such as tornado warnings or other messages to the target audience. The simple encoder is used to create new captions and has no internal decoder.

A means for encoding a character set for certain alphabet characters, namely, the ASCII character code is well known and comprises 96 different hexadecimal codes for pointing to corresponding characters in memory. Thus, two bytes transmitted one byte per field or two bytes per frame uniquely point to an alphabetic, control, punctuation, or other character for display in English. As the NTSC transmission rate provides for the transmission of 30 frames (of two interlaced fields) per second, the data transmission rate for alphabet characters can be as high as sixty characters per second which are stored and displayed, as controlled by display command data, simultaneously with the spoken message in intelligible form, such as in complete sentences.

A problem with existing decoders is that they are only capable of receiving captioning data in one language at a time, for example English, French, German, or Spanish, which is based on the Roman alphabet. Nevertheless, the NTSC format is used in other major countries as well such as Korea, Japan, and Taiwan. In such countries therefore, there is an opportunity to provide captioning in the languages of these countries.

namely Korean, Japanese and Chinese, consistent with the NTSC standards and known methods of caption transmission utilizing the data-carrying capabilities of the vertical blanking interval.

On the other hand, languages, such as Korean, Japanese and Chinese, and for the purposes of the present application, the Korean language will be discussed as exemplary, are unique in their means of recording the spoken word. Notwithstanding a danger of oversimplification, such languages are recorded in the form of pictographic or ideographic communications, rather than on a Roman letter by letter basis as in English to form syllables from a plurality of letters. The Korean alphabetic character set, in particular, provides hints as to how to form one's mouth to speak a syllable represented by a character. Consequently, fewer characters are required to form the same thought or sentence as would be required in English, but the greater variety of characters and their relative complexity make the ability to print the Korean character set difficult.

From the Korean government publication *Han'gul, (Korean Alphabet and Language)*, Korea Background Series Volume No. 9, available through the Korean Overseas Information service and published in December, 1981, it is described how the Korean alphabet was developed by King Sejong in relatively modern times to phonetically describe sounds making up syllables of words. The Han'gul alphabet, a syllabic alphabet, comprises twenty-eight letters comprising seventeen consonants and eleven vowels. Consonants and vowels alternate in words to form syllables of words which phonetically describe how to pronounce Korean words.

The Korean language is thus unlike English. In the English language, strings of consonants may be run together such as "str" in "straight" and a combination of vowels and consonants may have to be interpreted together before one may pronounce a word, such as the combination of letters "aight" in "straight".

For the purposes of the present application and claims, and for want of better terminology, the term "Roman alphabet" will be used to describe a category of alphabets for Latin-based languages, for example, such languages as English, French, Spanish, German, Dutch, Swedish and such. The term "syllabic alphabet" will be used as a term of art to describe a category of alphabets used in various languages such as Korean.

According to the well-known ASCII coding format, two consecutive bytes of data may combine to form a hexadecimal pointer into a Roman alphabetic or other character memory to obtain letters, numbers, or other special characters for display. There is no well-known, published coding scheme for providing captions in a syllabic language such as the Korean language.

Associated with solving the problem of providing an electronic typewriter for the Korean language, C. H. Yeh in U.S. Pat. No. 4,187,031, suggests an encoding scheme whereby sets of hexadecimal numbers be provided for the Hangul character set, one for the alphabetic symbol, and another, called a form code, for defining how to build a Hangul character. Such a coding system, however, has its limitations if adapted for data transmission within a line of a vertical blanking interval. Yet, there is an obvious need to provide captioning for deaf or hard-of-hearing people in countries such as Korea or, more particularly, to provide dual language captioning in any country including the United States.

SUMMARY OF THE INVENTION

Thus, it is a general object of the present invention to provide means for recording, encoding, transmitting, receiving, decoding, and displaying recordable sounds of various languages, for example, for providing captioning, text or other services such that alphabetic, numeric and other characters of a syllabic language, consistent with known formats for encoding Roman alphabetic, numeric, musical note and other characters of a language such as English, French, German or Spanish for transmission, may eventually be displayed on a viewer's screen. Thus, it is also a general object to provide both Roman and syllabic alphabet captioning for display on an associated television signal receiver, telecommunications device or other apparatus for displaying the spoken word.

In order to accomplish these general objects, it is a specific object of the present invention to provide a method and apparatus for encoding and decoding the Roman and syllabic alphabets in a manner for transmission and reception on a single line of the vertical blanking interval of a television signal.

It is a further specific object of the present invention to determine an appropriate character and caption size for display on a standard resolution television set to enable a syllabic alphabet character and caption comprising the characters to be readable on a standard resolution color television screen and to further extend the principles of the present invention to enhanced or high definition television or telecommunications receivers as they become more commercially and widely available.

It is a still further object of the present invention to extend the principles of the present invention to the display of caption, text or other services in ideographic languages such as Japanese and Chinese.

In accordance with the present invention, a method of encoding syllabic alphabetic or numeric characters provides for transmitting four bytes of syllabic language data at a particular line of alternating fields of a standard, enhanced or high resolution NTSC, PAL, SECAM, MUSE or other television or telecommunications signal. The bytes are formed by encoding a syllabic block of language data into the four bytes, preferably in two byte increments to comply with existing standards, in such manner that upon receipt the four bytes are decoded into three bytes of pointer data into a master Korean syllabic alphabet including Roman alphabetic characters, number or other special character memory. For the master Korean or syllabic language character set including both the Han'gul and Roman alphabets, the four byte data packet comprises one "head code" and three "tail" codes, as will also be subsequently defined herein in connection with the following discussion of FIG. 3.

In accordance with the invention, the principles of the present invention may be extended to provide captioning in the Japanese and Chinese languages as well. These ideographic languages will require application of one head code and two tail codes; that is, only sixteen bits or two bytes would be required to identify approximately twenty thousand pictographic characters, a typical vocabulary of one using an ideographic language to communicate.

In particular for the Korean (and English) language, four seven bit data packets are decoded using bit-mapping techniques into one seven bit and two eight bit pointers. These pointers may particularly comprise Korean letter components pointers for pointing to components of Korean (syllabic) and English (Roman alphabet) characters in memory. The Korean letter components stored in memory are, for example, partial images comprising display segments of picture elements at particular locations in a character cell which in combinations of two or more are overlaid to form Korean syllabic characters for display in the cell.

Depending on the syllabic character for display, the two or more display segments of a Han'gul character may be extended in horizontal or vertical dimensions in the character cell. Because of the higher resolution required to read Korean characters, it has been determined that the optimum size of a character cell for Korean characters for display on a nineteen inch television screen be approximately ⅝ inch, slightly larger than the half inch suggested for display of the Roman alphabet. In particular, a syllabic language character such as a Korean language character may comprise a ten by sixteen picture element character such that it fits wholly within a twelve by twenty picture element display cell. The character may be preferably highlighted, foreground on background, for example, white on black for ease of reading. With a high definition television receiver and as presently contemplated, the syllabic character set may be displayed with a character cell size of ¼ inch, despite the greater complexity of the Korean syllabic characters.

In particular and to conform with known standards, Korean language closed caption data may be encoded and transmitted on line 21 of field 2 of each frame of an NTSC television signal. Preferably, a display of syllabic characters may comprise nine rows of syllabic alphabet or other characters in twenty columns. With respect to an NTSC television signal, the phonetic language display will begin at line 51 and comprise 180 lines in total, ending toward the bottom of the image at line 230 (of 262 or 263 lines maximum, the even and odd fields respectively). However, one of ordinary skill in the art may transmit the recorded word at any particular line of other known or contemplated formats following the principles of the present invention.

Consequently, according to the present invention, a method of decoding the caption data transmitted with a composite television signal is characterized by the steps of decoding data packets of printable characters and command codes comprising a plurality of data bytes indicated as to type by value or by particular bit indications appearing in one of the bytes of the data packets, decoding the head code and tail codes of each printable character data packet, storing a plurality of characters and display segments in memory for at least two languages, a first language having the Roman alphabet and a second language having a syllabic alphabet, determining if the data packet represents a non-printable character or command code, and mapping remaining bit positions for a printable character into a number of letter component pointer bytes less than or equal to the number of data bytes comprising the data packet, the letter component pointer for pointing to Roman or special alphabet characters or to one of a plurality of syllabic alphabet letter components in memory. The plurality of syllabic letter components are given by starting coordinates and by dimensions and are overlaid to form a syllabic character for display with a remaining picture signal.

Various methods may be employed for determining if captioning in English or Korean is to be provided. For example, one method is to provide a switch on a decoder for reading either line 21 field one data (language channel one) or line 21 field two data (language channel 2). Another method is to provide in-channel data within a particular language channel for defining a means for evaluating the letter component pointer bytes and, if they have a certain value, then assume that it or another predetermined byte relate to a particular alphabet type, Roman or syllabic. These and other features of the present invention will be discussed in greater detail in connection with the detailed description of the drawings which follow.

BRIEF DESCRIPTION OF THE DRAWINGS

FIGS. 1C(1) and 1C(2) are block schematic drawings of a second close-caption processor of the decoder of FIG. 1A comprising four integrated circuits according to the present invention;

FIG. 2B is a standard Latin or Roman alphabet character set including special characters and respective eight bit codes;

FIG. 2C is a table providing miscellaneous control codes for data channel 1 or 2 caption transmission;

FIG. 2D is a table providing mid-row attribute codes for caption transmission;

FIG. 2E provide preamble address codes for caption transmission;

FIGS. 3B through 3E comprise completed bit maps for encoding/decoding Korean syllabic characters and Roman alphabetic characters according to the present invention;

FIG. 4 comprises a character font set according to the present invention for displaying the three hundred most common Hangul syllabic characters;

FIG. 5A is a table showing Hangul character type, size in display segments, the start coordinates, the number of Hangul syllabic characters, the number of nibbles required for storage in character memory and the total number of bits;

FIGS. 6A through 6E comprise encoding tables showing Hangul character type, letter components, their size and starting coordinates; in particular, FIG. 6A shows encoding of initial consonants of two component syllabic characters; FIG. 6B shows encoding of initial consonants for three part syllables; FIG. 6C provides a table of vowels by initial consonant groups for two part syllables; FIG. 6D provides a table of vowels by initial consonant groups for three part syllables; and FIG. 6E is a table of final consonants by vowel types for three part syllables;

FIGS. 7A, 7B and 7C comprise letter component tables for encoding or decoding Hangul syllabic character elements for display, FIG. 7A relating to the first of three pointers, FIG. 7B relating to the second pointer and FIG. 7C relating to the third pointer;

FIGS. 8A through 8D are flow charts of the decoding process for decoding command codes and either Roman alphabetic, numeric or other characters or syllabic alphabetic, numeric or other characters according to the present invention;

FIG. 9, by way of example, shows the process of displaying a Hangul character element or letter component according to the present invention.

DETAILED DESCRIPTION OF THE DRAWINGS

Figure 10:
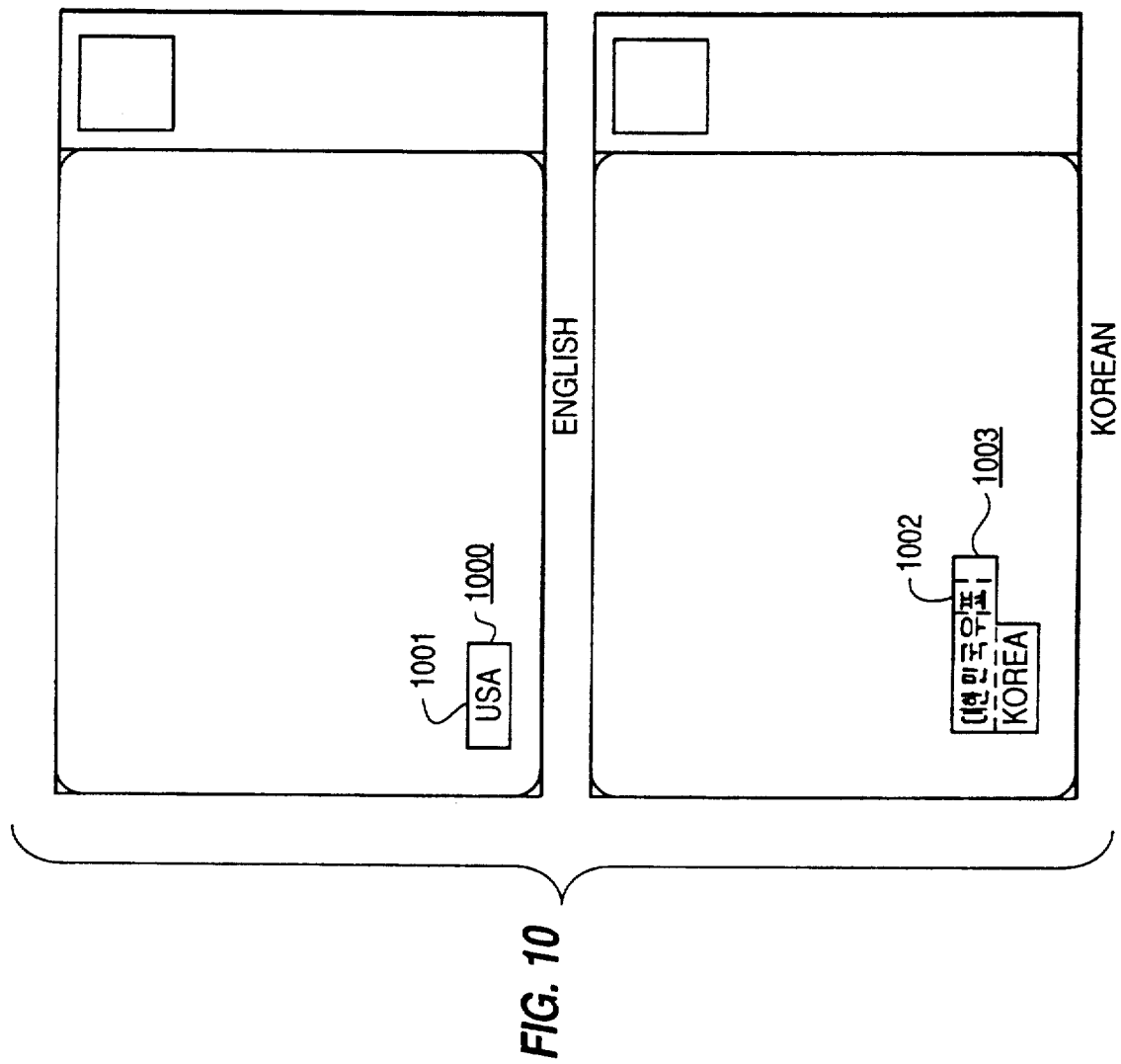
FIG. 10 comprises typical displays of Latin or Roman alphabet character data represented by the letters USA followed by a display of Hangul and Latin character data, showing a preferred character display whereby each syllabic language character is approximately ⅛ inch high on a nineteen inch standard resolution television screen and the caption appears between horizontal lines 51 and 230 and preferably toward the bottom of a television image.

In order to better understand the principles and concepts of the present invention, the following definitions are provided for terms of art employed within the specification and claims:

A caption box is a contiguous display region surrounded by a solid border that overlays a variable portion of a video image and contains video image related textual information. The caption box supplements a video image displayed on a television or other display screen by providing an alternative presentation of the audio portion or recorded speech of the associated video image. More than one caption box may be displayed on screen at the same time, for example, when two or more people are speaking in a particular scene of a television program. Examples of caption boxes are shown in FIG. 10, for example, caption box 1000.

A display cell is a subpart of a caption box which contains an image of a Roman alphabetic, a numeric or a syllabic language alphabetic character, for example, a letter of an English word, a number, or a syllabic (Han'- gul) character of the Korean language. This region encompasses an area with a height of one row and a width of one column; yet, the pixel size of the display cell will vary between language types. Referring briefly to FIG. 10, the actual pixel dimensions of a display cell are dependent upon the maximum row and column dimensions allotted to the particular display format for a selected language type. Display cell 1001 is an example of a Latin character display cell and display cell 1002 is an example of a syllabic character display cell.

Figure 5B:
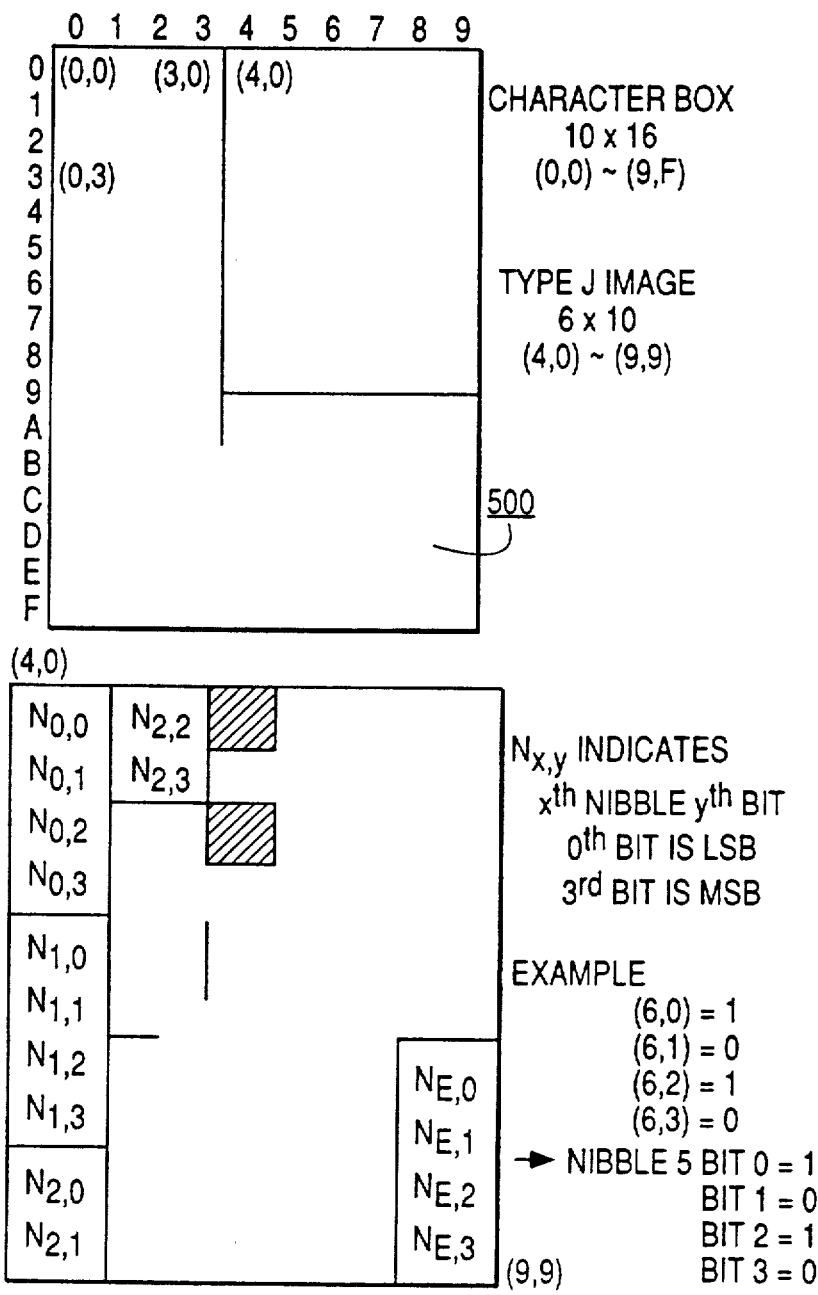
FIG. 5B shows an example of Hangul character display requiring 10×16 display segments and showing typical beginning coordinates and a display of a type J character element image.

A character cell is wholly within a display cell and comprises the maximum area of a particular character. A border surrounding a character cell plus the character cell is equivalent to the display cell. Referring to FIG. 5B, there is shown a 10×16 character cell for a Hangul syllabic character, sometimes referred to herein also as a character box.

Han'gul is the name of the Korean language alphabet.

Han'gul syllabic characters comprise Han'gul letter components and display segments used to make up a Hangul syllable. The letter components may comprise partial images of syllabic characters comprising combinations of appropriately placed lines, dots and other such shapes formed of picture elements. FIG. 4 provides a font for the three hundred most common syllabic characters.

FIGS. 7A through 7B provide Hangul letter components which comprise the syllabic characters.

Han'gul syllables comprise a group of Han'gul characters displayed in a display cell, the syllables used to form Korean words. Referring to FIG. 10, there is shown a Korean caption box in which is displayed a Korean word and its English language counterpart.

The Korean (dual language) syllable comprises a string of four successive printable ASCII compatible codes, for example, from line 21 of the vertical blanking interval defining a Han'gul syllable or a Roman alphabet based alphanumeric character. The four codes comprise a data packet of one head code and three tail codes, for example, as per one of FIGS. 3A through 3E.

A letter block is an image enclosed entirely within a display cell that forms either a Han'gul syllable or a Roman alphabet based character. The letter block is equivalent in size to a character cell.

A letter component is one of a collection of character elements that combine to form a letter block. An English alphanumeric character will have one image per letter block. A Han'gul syllable, on the other hand, may comprise two or more letter components or partial images per letter block.

Figure 1A:
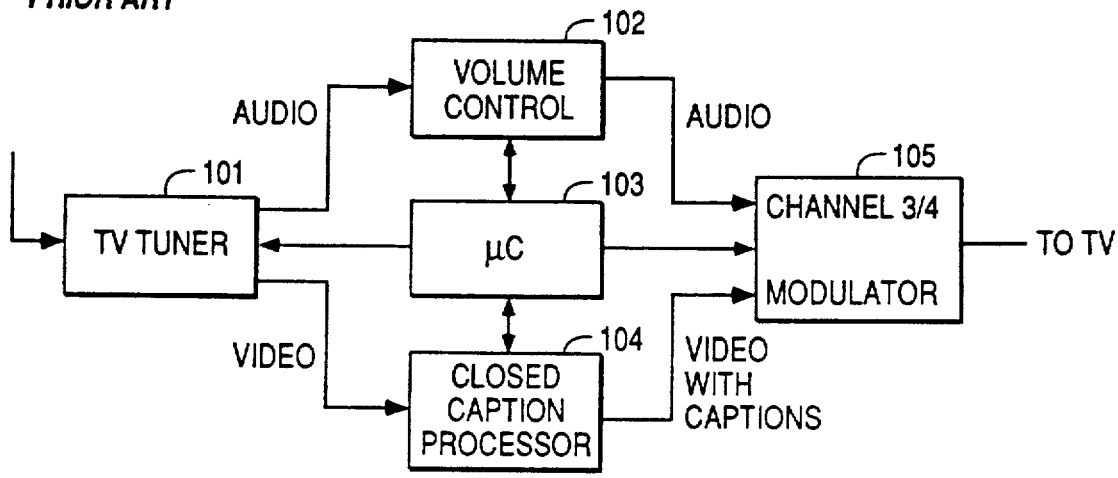
FIG. 1A is a block schematic drawing of a known caption decoder for decoding caption and command code data transmitted at line 21 of the vertical blanking interval of a television signal.
Figure 1B:
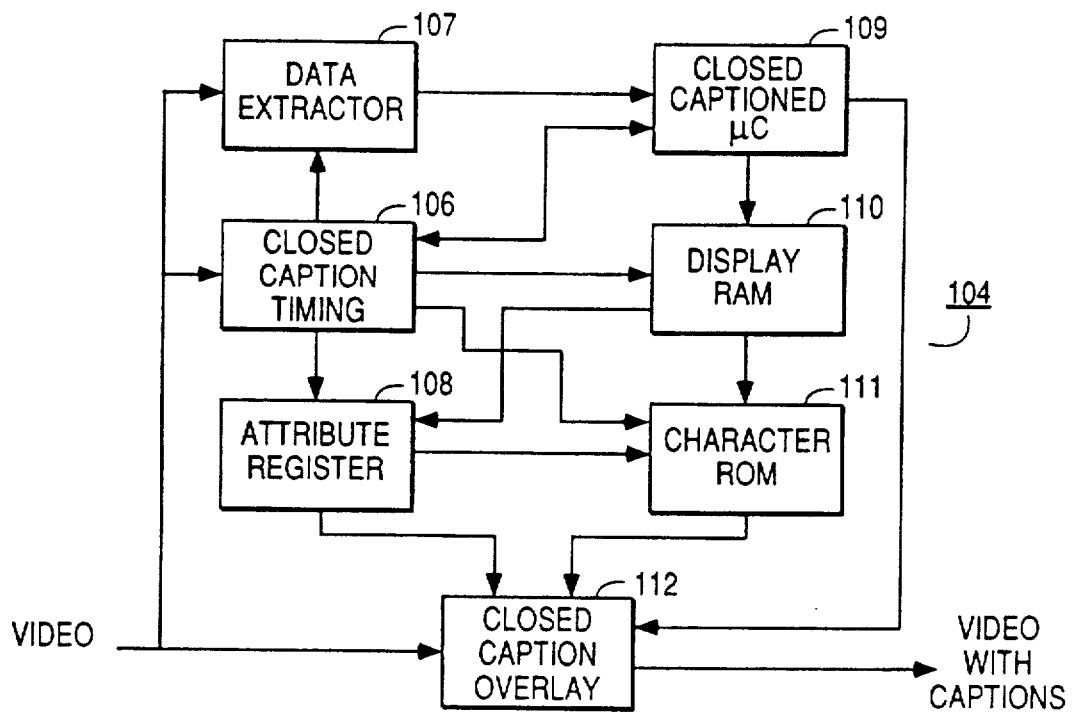
FIG. 1B is a block schematic drawing of a first close-caption processor of the decoder of FIG. 1A or of a close-caption processor comprising two integrated circuits according to the present invention.

According to FIG. 1A, there is shown a block schematic diagram of a known TeleCaption 4000 caption decoder for decoding caption and command code data transmitted at line 21 of the vertical blanking interval of an NTSC television signal for display on a television screen. FIG. 1B provides particular details of the closed caption processor of FIG. 1A. FIGS. 1A and 1B are already described in the Background of the Invention section of the present invention in regard to the operation and circuitry of a TeleCaption 4000 decoder. According to the present invention, however, the closed caption processor 104 Of FIG. 1B comprising two integrated circuits, as described above, may be replaced by a processor as described herein for decoding a master Korean language character set.

Referring to FIG. 1C, the block functional elements of FIG. 1B may be arranged to comprise a four integrated circuit functional chip set. An incoming video signal may be split and a portion provided to six bit analog to digital conversion circuit 116 and a portion provided to synch stripper or processor circuit 113, which may be a conventional synch stripper circuit known in the art. The six bit analog to digital conversion circuit may comprise a UPC 661 integrated circuit available from the National Captioning Institute. Analog to digital converter 116 comprises data extractor block 107 and a portion of closed caption timing block 106 while the remaining duties of closed caption timing block 106 are performed by sych stripper 113. Processor block 115 comprises a custom forty pin proprietary integrated circuit from the same chip family as the TPU 2740 described above, manufactured for the National Captioning Institute by ITT Corporation. This chip comprises closed caption controller block 109. character ROM 111, and caption overlay block 112. Controller 115 communicates with dynamic random access memory (DRAM) 114 which comprises attribute register block 108 and display RAM block 110. DRAM circuit 114 most conveniently comprises, for example, a UPD484256 128 kbyte memory available from the National Captioning Institute. The analog to digital conversion circuit 116 and the Controller circuit 115 are clocked by clock circuit 117 at, for example, 14.3 MHz for data extraction. The data clock is most conveniently a multiple of the horizontal line rate of the incoming video signal. The controller itself is clocked at, for example, 20 MHz by clock circuit 118 for data processing purposes. The software algorithm for controller 115 will be described in detail herein in connection with a discussion of FIGS. 3 through 9.

Figure 2A:
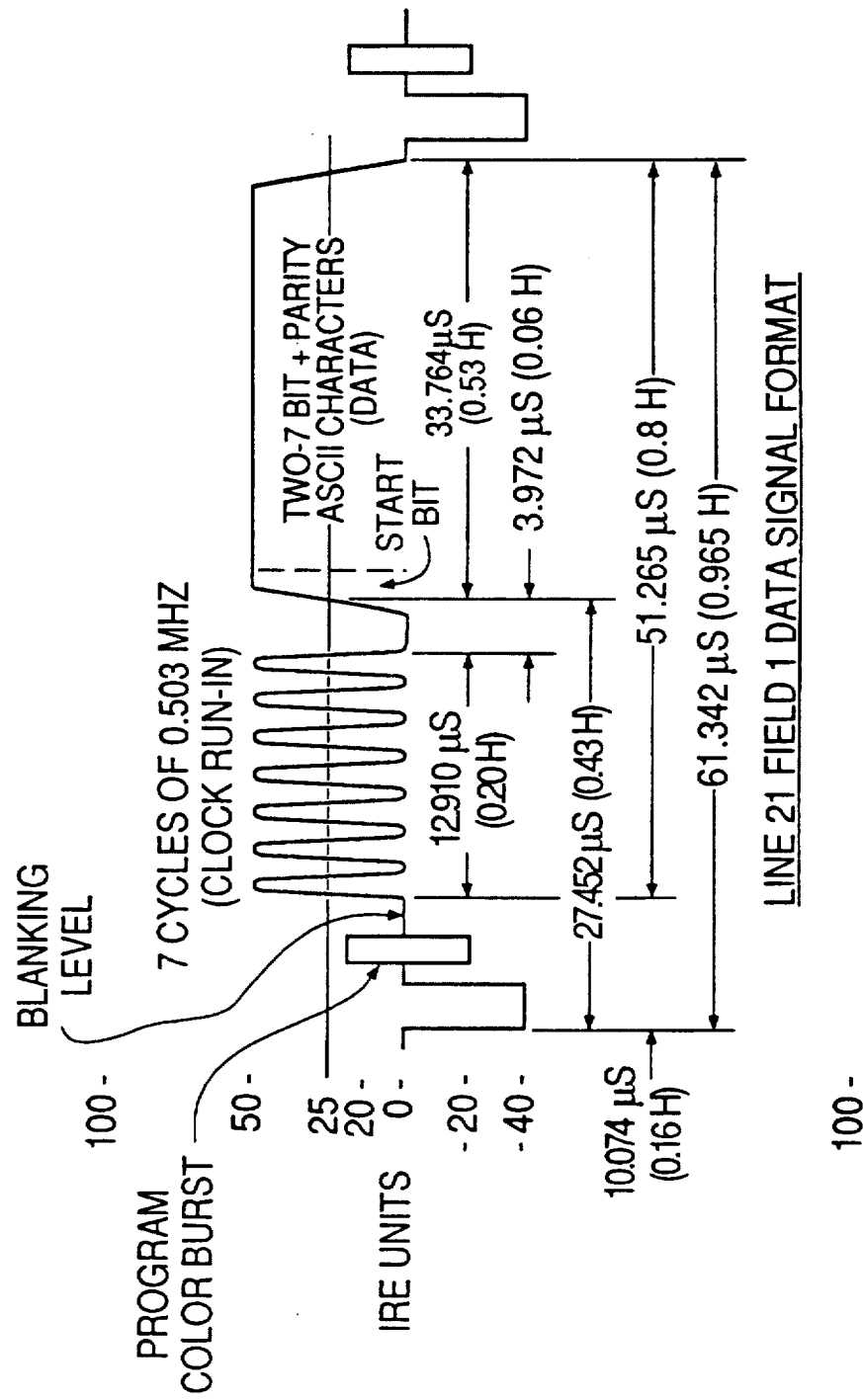
FIG. 2A is a waveform diagram of the line 21, field 1 data transmission signal for transmitting captioning data for a television signal pursuant to standards promulgated by the United States Federal Communications Commission.

Referring to FIG. 2A, captions associated with a television program are transmitted as an encoded composite data signal during line 21 of a standard NTSC video signal. The signal consists of a clock run-in signal, a start bit, and sixteen bits of data corresponding to two separate bytes of eight bits each. The eight bit bytes typically each comprise a parity bit and a seven bit ASCII or special character and command code data as per FIGS. 2B through 2E. Thus, data transmission is at a rate of 480 bits per second calculated as follows: eight bits per field times sixty fields per second amounts to 480 bits per second. According to a frame rate of thirty frames of two fields each, data is transmitted at four bytes per frame. This data stream contains encoded command information which provides instructions for formatting characters as well as the characters to be displayed and other characters. According to the present invention not only are ASCII and other character data transmitted as per FIG. 2B but Hangul syllabic data as well, as will be further described herein.

Still referring to FIG. 2A, there is shown a waveform diagram for the caption data signal of line 21 of the vertical blanking interval. After a horizontal blanking pulse and a color burst, a clock run-in signal is provided consisting of a seven-cycle burst of sinusoidal frequency phase-locked to a caption data run-in signal whose frequency, 32 times the horizontal line rate, is twice that of the data clock, providing synchronization for the data decoder (or encoder) clock. According to the principles of the present invention, the clock run-in is most efficiently evaluated for determining a half power data-slicing value for the following data stream. If one multiplies thirty-two times the horizontal line rate of 15.732 kHz, the decoder clock rate is obtained at 5.034965 MHz. The clock run-in signal is followed by two data bits at a zero logic level, then followed by a logic one start bit. The last two cycles of clock run-in of 5.034965 MHz, these last two logical zeroes, and the logical one start bit together constitute an eight bit frame code signifying the start of data.

The transmitted data following the eight bit frame code is transmitted in non-return-to-zero (NRZ) format. Seven bits of data for each character are followed by a parity bit indicating odd parity for error detection.

Each caption transmission is preceded by a preamble code, which consists of a non-printing character and a printing character to form a row address and display color code. Preamble address codes are shown in FIG. 2E. Both characters together form a control code, and all control codes are transmitted within a single field of line 21 and twice in succession to ensure correct reception of the control information contained within the code. Miscellaneous control codes are shown In FIG. 2C. These include alarm, roll-up, flash on, resume, and erase commands.

Transmitted captions may be interrupted by mid-caption control codes between two words in order to change display conditions such as color, underline or italics, for example, used for emphasis. Mid-row control codes are shown in FIG. 2D. At the completion of a caption transmission, an end-of-caption control code is sent as per FIG. 2C.

The first character of a control code is a non-printing ASCII character, 0000000 through 0011111, but codes 0000000 through 0010000 are not used. Thus, non-printing control codes are easily distinguishable from printable characters. This is followed by printing characters which have the code series 0100000 through 1111110. All characters that are received after a set of valid control codes are interpreted and loaded into memory as characters or letter components to be printed. Character codes with bad parity result in ones code being written into memory; this normally causes display of a blank background box (a delete symbol). This delete symbol is typically displayed in place of a desired character transmitted in error. Spelling and context error correction algorithms are known, however, which can make a high probability guess at the identity of the character transmitted in error.

For Roman alphabetic character display on a television screen, the caption display typically consists of fifteen rows of characters with up to a maximum of 32 characters per row. A switch of the known decoder allows services to be provided to be switched between captioning services and text services. In a captioning mode of operation, a maximum of four rows of characters are utilized during the encoding process for a typical caption, the purpose being to synchronize a caption with a typical scene of a movie or other entertainment event and not to interfere significantly with enjoyment of the event. These four rows comprising a caption can appear anywhere in the allocated fifteen rows, but typically appear in the bottommost rows so as to not interfere with the action portion of a television image. Each character row occupies 26 out of 525 horizontal lines of a two field frame. The first row of the fifteen possible rows starts at line 43 in each successive field, be it the even or odd field (262 or 263 line field) of a standard resolution NTSC display. Thirteen lines of each, odd and even, field make up a twenty-six line high character.

Each row is displayed with a black or other surround for a, for example, white character in order to enhance its readability against a normal video picture background. The black box surrounding the row extends one character to the left of the first character and one character to the right of the last character to be displayed in a row.

Each letter block of a Han'gul language character is represented in a caption display by a combination of two or more letter components. The number and placement restrictions upon the letter components in a character cell allows all possible Han'gul letter blocks to be represented by a combination of one 8 bit head code and three 8 bit tail codes as per FIG. 3A. This represents a requirement for transmitting 23 bits of usable data to represent all possible Han'gul letter blocks, as represented by the five empty head code bit positions and eighteen empty bit positions in the three tail codes of FIG. 3A.

The well-known line 21 data transmission protocol requires a seven data bit word length, with an eighth bit as a parity bit. The transmission of four of these seven bit words will be more than adequate to meet the requirement of transmitting at least 23 bits of usable data to represent all possible Han'gul letter blocks. The resulting data rate of fifteen letter blocks per second is more than adequate for Korean closed captioning calculated as follows: sixty bytes per second maximum data rate divided by four bytes per letter block. Furthermore, the four bytes per letter block may be most conveniently transmitted two bytes per field in the same manner as English language captions.

Figure 3A:
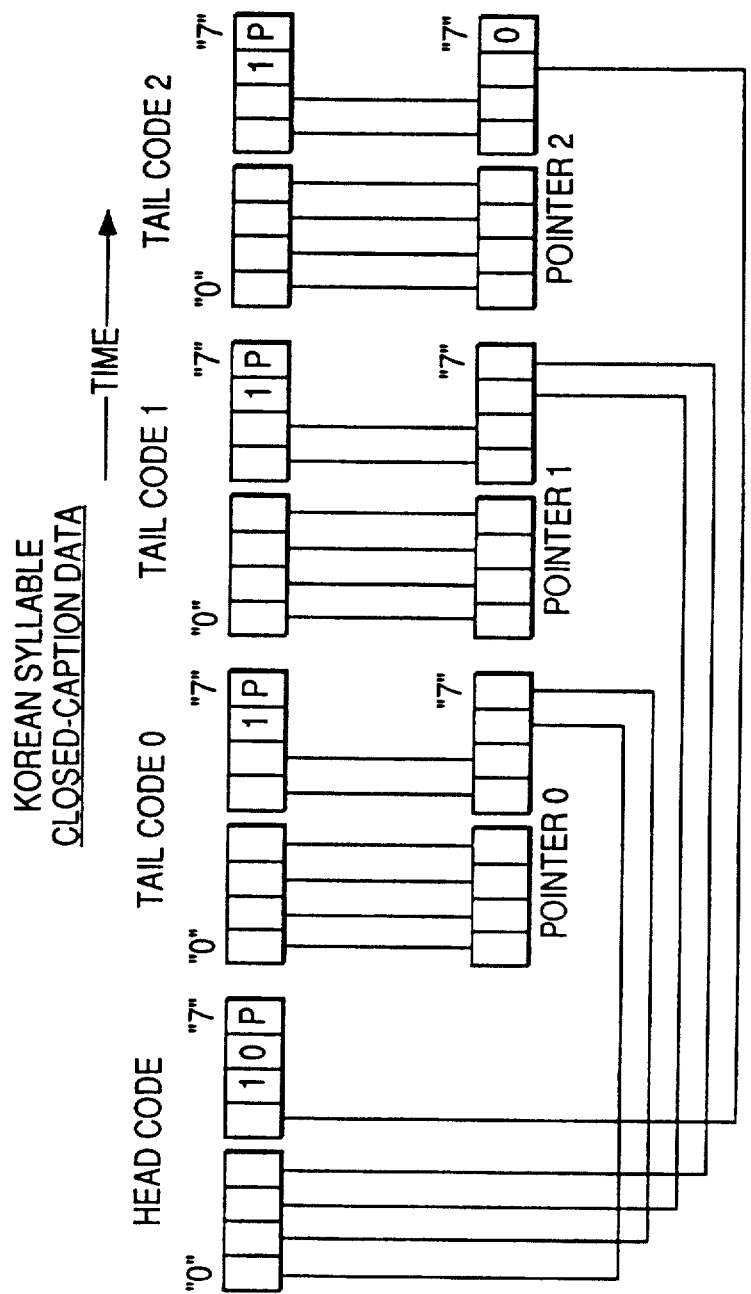
FIG. 3A is a bit map for decoding (or, in reverse, encoding) a four byte language data packet into three syllabic or Roman alphabetic or other character component pointers for pointing to character data stored in decoder read only or non-volatile memory (character ROM) shown in FIG. 1.

Referring to FIG. 3A, there is shown a bit map for detecting and translating the four 8 bit packets of Korean language data, i.e. a head code and three tail codes into one 7 bit (pointer 2) and two 8 bit pointers (pointers 0 and 1) to Han'gul or Roman letter components stored in a decoder character ROM or non-volatile memory. Only one representative bit-mapping scheme is shown, but the principles therein indicated may be modified to create other bit-mapping schemes without violating the principles of the invention. In the reverse, it likewise shows a method of encoding Korean characters for transmission. The seventh bit position of a head code or any tail code may be, to be consistent with the prior art ASCII caption transmission scheme, the parity bit and is denoted P. In a typical decoder, this bit is used for error detection and a delete or nul character displayed. Bits 5 and 6 of byte 0 are set to 1 and 0 respectively to indicate the first or head code of four bytes forming the Korean (dual language) data packet. Bit positions 0 through 5 of tail code bytes 0, 1 and 2 may conveniently become bits 0 through 5 of related pointer bytes as described below. Otherwise, the bits shown are mapped from the respective head code data byte to corresponding bit positions 6 and 7 of the three letter component pointer bytes as shown.

Now the encoding process of the present invention will be described in considerable detail in connection with the following discussion of FIGS. 3B through 3E. Encoding apparatus is not shown for the present invention but preferably comprises a standard personal computer with appropriate input and output devices selected for the intended application. For example, a live news broadcast may be simulcast with recorded audio captioning by means of voice recognition and encoding circuitry applied for data input. The personal computer of the encoder may comprise encoding tables and algorithms as described herein in connection with encoding FIGS. 6A through 6E.

Firstly, an encoding of the Korean character "ha" will be described according to FIG. 3B with reference to FIGS. 4, 5A, 6A through 6E, and 7A, 7B, and 7C as appropriate. The Hangul character "ha" is one of the three hundred plus most common syllabic characters and is shown at coordinates (1,1) of FIG. 4. Rather than store entire syllabic characters according to FIG. 4 in decoder character ROM, only letter components are stored as per FIGS. 7A, 7B, and 7C which are overlaid as appropriate to form the entire syllable. In particular, the Korean character "ha" comprises two such letter components or partial images.

A Korean syllable may comprise as many as three components, an example of which will be described in connection with the following discussion of FIG. 3C. Nevertheless, the first step of encoding the present example, "ha", comprises identifying the two letter components and a null component of the syllabic character.

Referring to FIG. 7A, pointer 0, the first pointer to the initial consonant, is defined to comprise code 00 0E (14 in decimal). The reader will note that there are other similarly portrayed letter components such as those represented by codes 20 01, 20 0F, 40 02, 50 05, 60 03, 70 06, 80 09, 90 07, A0 0A, B0 0D and C0 0B. It is a principle of the present invention to decrease the cost of a decoder in relation to the cost of an encoder. In this regard, encoding software and related processing may allowably be hundreds of times more expensive in view of the relative relationship between the expected number of encoders and decoders. In other words, only one encoder need be required, for example, for each transmitting station while the expected number of decoders may be on the order of millions. Nevertheless, according to the present invention, encoding is relatively simple and determined per FIGS. 6A through 6E as will be subsequently explained. Consequently, encoding software may most conveniently make a determination as to which among these several codes for each letter component pointer is appropriate based on the entire syllabic character to be transmitted. The determination is related to the relative dimensions of the letter component compared with the entire syllable to be transmitted. In particular, FIGS. 6A through 6E are referred to first identify an initial consonant (FIGS. 6A and 6B), a middle vowel (FIGS. 6C and 6D) and a final consonant (FIG. 6E) of a syllable, if a final consonant is required (i.e., a three letter component syllable). Thus, decoder software, on the other hand, may be comparatively unsophisticated and simply be actuated to overlay partial image upon partial image based on the order of letter components transmitted until a character block is filled.

FIG. 6A provides the initial consonant for a two part syllable, such as "ha", while FIG. 6B provides the initial consonant for a three part syllable. When followed by a simple A or vertical type vowel, the consonant is shown by table position decimal 14, a 6×16 dimension image (hexadecimal image 00 0E). In binary, most significant bit first, the pointer 0 register of FIG. 3B comprises 0111 0000. The consonant will be displayed beginning at coordinates (0,0) of the character cell.

In a similar manner, pointer 1, for the final vowel of the two part syllable "ha", is determined from FIGS. 6C or 6D and 7B. Referring first to FIG. 6C, FIG. 6C shows desired vowels down the left hand column and initial consonants across the top. The initial vowel is shown at position 209, the first vowel in the first row, as a 5×16 dimension image beginning at coordinates (5,0). Referring to FIG. 7B, the possible encoding choices comprise 00 01, 00 0A, 20 0B, and 30 04. Again, because the example "ha" is represented by only two letter components and its dimensions may be large, the code chosen for the vowel component of "ha" by encoding software is 00 01, the first or 209th letter component after the 208 letter components of table FIG. 7A. In binary, most significant bit first, the pointer register of FIG. 3B comprises 1000 0000.

Lastly, since this is only a two letter component character, the last pointer code for transmission is a reserved nul character code or 00 00. The pointer 2 register of FIG. 3B shows 0000 0000.

Figure 3B:
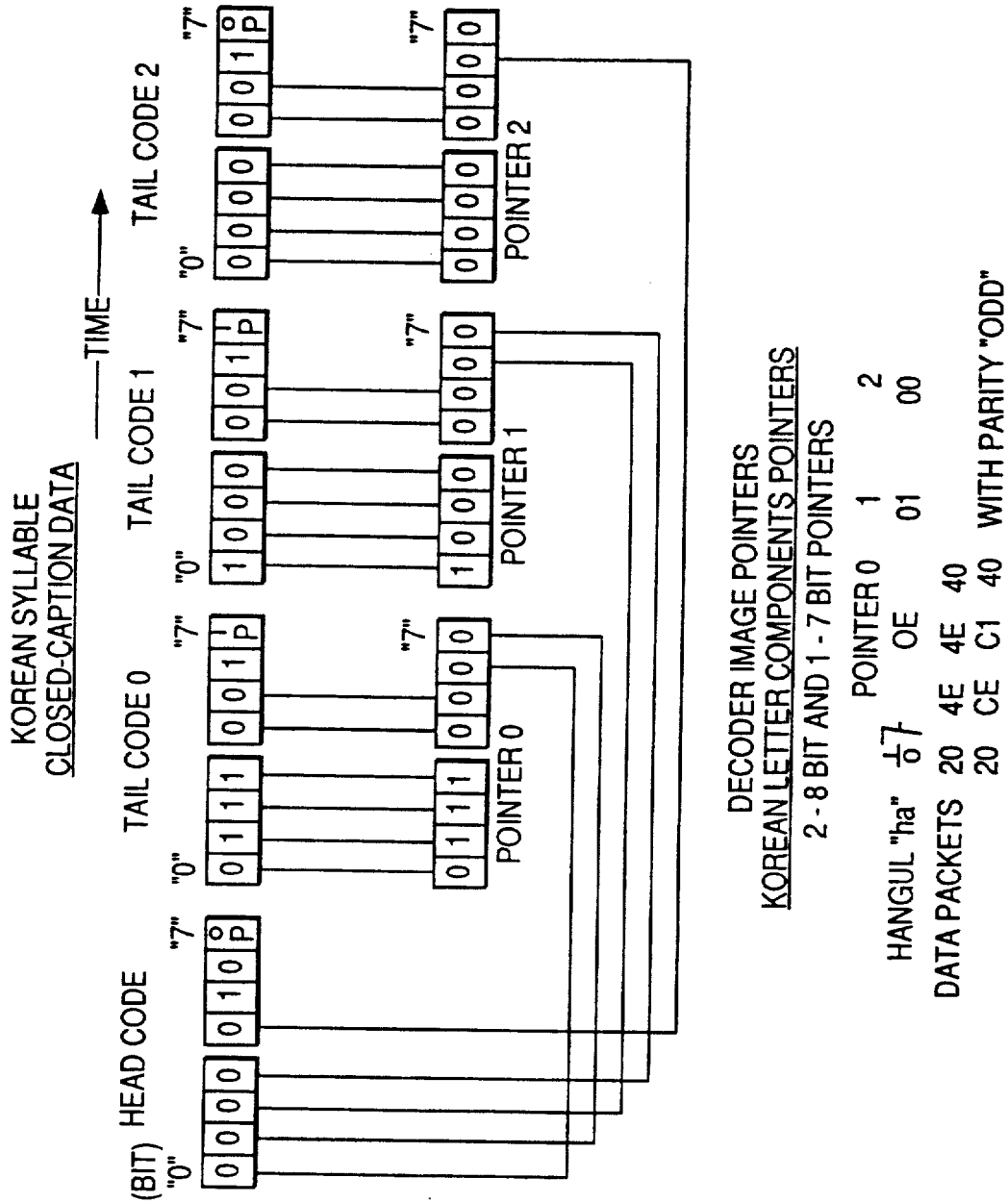

Now referring to FIG. 3B, pointer 0 represents the hexadecimal code 0E, most significant bit first, as 0111 0000 filling bit positions 0 through 7. Pointer 1 is represented as 1000 0000 for hexadecimal 01, most significant bit first. Lastly, the nul pointer 00 is represented by a string of zeros. The binary data contents of these three pointer registers are translated or bit mapped into contents of one head code register and three tail code registers for eventual data transmission.

Bit positions 0 through 5 of each pointer byte 0 through 2 map directly into bit positions 0 through 5 of each tail code byte 0 through 2 for transmission as shown. Tail code bit position 6 is always a 1 so parity bit P at bit position 7 may now be calculated, as shown, for odd parity. Thus, in tail code 0, parity bit "P" is a "1"; in tail code 1, parity bit "P" is a "1"; and in tail code 2, parity bit "P" is a "0".

The head code byte is comprised of data from bit positions 6 and 7 as shown from pointer bytes 0, 1, and 2. Bit positions 6 and 7 of pointer 0 become bit positions 0 and 1 of the head code byte. Bit positions 6 and 7 of pointer 1 become bit positions 2 and 3 of the head code byte. Lastly, bit position 6 of pointer 2 becomes bit position 4 of the head code byte while dues to the limited number of rows of letter component codes for pointer 2 from the table of FIG. 7C, it is assumed that the seventh bit position of pointer 2 is a "0" which is mapped as a "1" to bit position 5 of the head code byte. Furthermore, as a head code signal, bit position 6 is assumed to always be a "0" and as a tail code signal, bit position 6 is assumed to always be a "1". Parity for the head code byte is calculated, and for the present head code byte of FIG. 3B, the seventh parity bit position is set at "0" for odd parity.

Lastly, according to FIG. 3B, the data packets are serially transmitted over time preferably in two successive transmissions of line 21 two byte data. With odd parity, these are shown as data packets 20, CE, Cl and 40. Thus, with time increasing shown, the head code 20 is received first, determined to be a printing character, and the first partial image decoded per tail code CE. The first step of decoding is to remove parity from the head and tail code data and thus restore, for the head code and first tail code, the data 20 4E. Then, as per FIG. 3A in reverse, the head code bit positions 0 through 5 are mapped to the various bit positions of tail code register and tail code 0 mapped into pointer 0 completing pointer 0 to the consonant portion of "ha" as per FIG. 7A stored in decoder character ROM 111.

Following with the next line 21 transmission of data are tail codes 1 and 2. These are first decoded as to parity and then mapped into pointer 1 and pointer 2. The decoder then according to the present invention overlays the images for the two (or more) meaningful letter components over one another and displays their full image or letter block as defined above as clocked by the closed caption timing circuit 106 of FIG. 1B and in accordance with control code (non-printing) data of FIGS. 2C, 2D and 2E sent at some other time as described above.

Now, referring to FIG. 3C, the encoding of a three letter component Korean character "han" will be described in connection with FIGS. 6A through 6E. The first step for encoding "han" for transmission are to assemble the letter components in appropriate, predetermined order, for example, left to right, and bottom-most letter component last. The syllabic character "han" is found in the table of FIG. 4 at coordinates (7,5). The initial consonant is found by referring to FIG. 6B for three part syllables. Still at row 14 of the initial consonants, one goes down the columns to find an appropriate vowel/consonant combination in the row data at the left. In this manner, the initial consonant is found to compromise decimal position 118, corresponding to hex 70 06 of the table of FIG. 7A. Referring to FIG. 7A again, now the encoder will choose hexadecimal code 70 06 for pointer 0 because there will be three letter components or partial images and the dimensions of each letter component must be smaller for all three images to be overlaid in a letter block. Hexadecimal code 70 06, most significant bit first, is represented as binary 0110 1110.

The vowel for the three part syllable "han" is found on table 6D, where the vowel for a three part syllable is given by columns J, K and L. For a simple consonant and still being in the first column for the given vowel, the particular decimal vowel code is found to be decimal 251. There are 13×16 or 208 letter components in FIG. 7A; thus, the required vowel is the 43rd (251-208) letter component of FIG. 7B. Referring to FIG. 7B for pointer 1, the encoder will choose code 20 0B, the 11th letter component of the third row, instead of the other possible choices because of the position and dimensions of the respective partial image. Hexadecimal 20 0B is represented in binary, most significant bit first, as 1101 0100.

Lastly, for pointer 2, and referring to FIG. 7C, there are two possible choices for the final consonant of the syllable "han", namely 00 01 and 10 0C. The final consonants of a three component syllable are found in FIG. 6E. The vowel that has been chosen is in the first column (vertical), thus the final consonant is found in the first M row. Because this is not the first consonant of the syllable, the encoder will select decimal pointer code 286. If FIG. 7C immediately follows FIG. 7B in memory, there are a total of 208+77 or 285 letter components represented by the two tables of FIGS. 7A and 7B. Consequently and in decimal notation, the 286th letter component is the first letter component of table FIG. 7C or hex code 01 or binary 1000 0000, most significant bit first.

Using the bit map of FIG. 3C, an encoder will map pointer codes 76, 2B and 1C into head code 21 and tail codes 0, 1 and 2 become 76, 6B and 5C without parity. With parity added, head code 21 becomes A1 and tail code 2 becomes DC; tail codes 0 and 1 remain unchanged. The transmitted head code for "Han" is 1000 0101. Tail code 0 is 0110 1110. Tail code 1 is 1101 1010. Lastly, tail code 2 becomes 0011 1011.

Now, encoding of a Roman alphabetic character according to the present invention will be described according to FIG. 3D and together with FIG. 3E, a Roman alphabetic syllable "ha" discussed. It is noted that the well-known ASCII encoding scheme of FIG. 2B is employed, wherein "h", for example, becomes 09 (in upper case). Thus, pointer byte 0 is 09 or, most significant bit first, 1001 0000. In one embodiment of the present invention, pointer bytes 1 and 2 are nul pointers. In accordance with another embodiment of the present invention, pointer byte 2 represents a second Latin alphabet or special character. Other alternative arrangements for improving Latin alphabet data throughput will become obvious to one of ordinary skill in the art according to various variations in the data transmission arrangement of Korean and Latin alphabetic characters.

Following through with the first embodiment, the bit positions of pointers 0, 1 and 2 are mapped as in the preceding example for a Korean syllable into respective head and tail code bytes. With and without parity, "h" becomes translated into head code 20 and tail codes 49, 40 and 40. The reader will note that in either embodiment pointer 1 is always a nul pointer which, together with identification of the head code, identifies the data pointer data upon receipt as Roman alphabetic data. Similar alternative rules can be fashioned for separating Latin from Korean characters.

Now, referring to FIG. 3E, the English alphabet character "a" is encoded, per FIG. 2B, as 18, (in upper case). Thus, pointers 0, 1, and 2 become respectively 18, 0 and 0 in the first embodiment (and in a second embodiment, pointer 2 may represent a second Roman alphabetic character). Either with or without parity, the four byte data packet becomes 20, 58, 40 and 40, where the head code byte is 20 or 0000 0100, most significant bit first.

The process of displaying a Korean character will now be described in more particular detail in connection with a discussion of FIGS. 5A through 6B, 7A and especially in view of FIG. 9. By way of example, the first consonant of a Korean syllable may be the letter component that looks like an upside down "L". The possibilities for drawing this letter component are shown in decimal in FIG. 6B, represented by decimal code 138. In hexadecimal in FIG. 7A, they are shown as 20 02, 30 05, 40 08, 50 06, 70 0C, 80 0A, 90 0D, A0 10, and B0 0E. Let us further assume, that of these choices, it is predetermined by the selected pointer code, that the letter component is of the type E variety as per FIGS. 5A and 6A, wherein, this consonant is the first of a three component syllable and begins at coordinate (0,0) of a character or letter block. Now, FIG. 5B shows a typical character block with certain starting coordinates indicated. Character type E being a 10×8 letter component will subsume the entire top half of the character block. For examples of syllables including this consonant, see FIG. 4 at coordinates (1,19) and (1,20). Other examples of type E letter components are shown in FIG. 6A, where 10×8 represents partial character cell overall dimensions. The table of letter component types of FIG. 6A is continued in FIG. 6B also showing size in picture elements and starting coordinates for each of letter component types A through M. And as already described, now that a three component character is assumed, the vowel and final consonant will be given by FIG. 6B.

FIG. 9 represents nibbles read in order from character ROM 111, which may be a non-volatile memory of the decoder of FIG. 1B wherein characters are formed from top to bottom and from left to right. Thus, nibbles 0 through 3 represent no image. The first bit of image is represented by the first bit read from nibble 4. The produced image shown is X . . . shown from the top to halfway down the third column of the produced partial image.

This partial image is then stored for display with another partial image filling the bottom half of the character block, for example, a type M letter component of an upside down "T" or horizontal line beginning at (0,10) per FIG. 5A.

For another example of character drawing, refer to FIG. 5B in which it is shown that a type J letter component or character comprises a 6×10 image beginning at (4,0) as per FIG. 5A. The bottom portion of the page shows that nibbles are read from character ROM 111 from top to bottom and from left to right. The third nibble, nibble 2,0 to 2,3, runs from the bottom of the first column to the top of the second column. In succession, the first printed nibble is nibble 5 at the top of the third column. Since (6,0) is a 1, the respective picture element is filled, as is (6,2) and so on, depending on the type J letter component or syllable portion to be displayed and the status of the bit for the picture element stored in character ROM 111.

Referring to FIG. 5B, three hundred twenty-seven characters may require a character or letter component ROM less than 32k in size. In particular, referring to FIGS. 7A, 7B and 7C, there are 327 different letter components shown for display which are the same 327 letter components used for calculating character ROM size as per FIG. 5A. There are 208 letter components in FIG. 7A, 77 in FIG. 7B and 42 shown in FIG. 7C. These letter components may be selectively displayed to generate the three hundred most common Korean syllabic characters shown in FIG. 4.

Many methods may be employed for providing simultaneous English and Korean captioning. One method is to allocate first and second language channels to line 21 field one and line 21 field two respectively. A decoder may be equipped with a simple switch to decode either the first or second language. Another method is to apply a single language channel for both languages. For example, the decoder may determine if the pointer is to point to Hangul or Roman alphabet components by evaluating the bytes of the data packet or the resultant pointer bytes. For example, if a letter component byte 0 and byte 1 are equal to 0, then byte 2 of the three pointer bytes may be a 7 bit English character pointer.

In regard to one embodiment of the present invention, bit positions 5 and 6 may signal the corresponding decoder as follows. If a 0,0 is transmitted in bit positions 5,6, the character is non-printable and the data represents a control code. If 0,1 are transmitted, the 1 in bit position 5 means that a 1 is placed in the corresponding bit position 5 of the pointer. Similarly, a 0 in bit position 5 if 1,0 are transmitted means that a 0 is mapped into pointer byte bit position 5. In this manner the evaluation of a particular pointer byte may be predetermined and, consequently, the determination of Roman Or phonetic alphabet pointer. A 1,1 in positions 5,6 is reserved to indicate the first byte of a Korean (dual language) data packet of four bytes. Whether English is transmitted or Korean, either a Han'gul syllable or an English alphabetic or numeric character will require four successive printable ASCII characters. As defined above, these four ASCII characters comprise a Korean (Roman alphabet or Han'gul phonetic alphabet) syllable block. The resulting data rate is, for Han'gul alphabetic characters, fifteen syllables per second. In English, the character rate is thirty characters per second. Either is more than sufficient data throughput for closed captioning in either language.

Referring now to FIG. 8A through 8D, there is shown a flowchart for a decoding process employed at a decoder or television receiver incorporating the closed caption processor 109 of FIG. 1B according to the present invention. The algorithm thereby represented is most conveniently adapted for inclusion in integrated circuit form, preferably, for example, as control software for an I.T.T. 40 pin ASIC integrated circuit as per controller 115 of FIG. 1C. The algorithm described by the flowchart is similar to the algorithm employed in the prior art decoder of FIG. 1A. Nevertheless, the present invention, as further described by the bitmapping diagram of FIG. 3, further may include the steps of determining if the data packet comprises Han'gul or other syllabic language caption data and English or other language caption data employing the Roman alphabet, and forming letter component pointer bytes for pointing to respective letter components in Korean character (letter component) ROM memory 111.

Figure 8B:
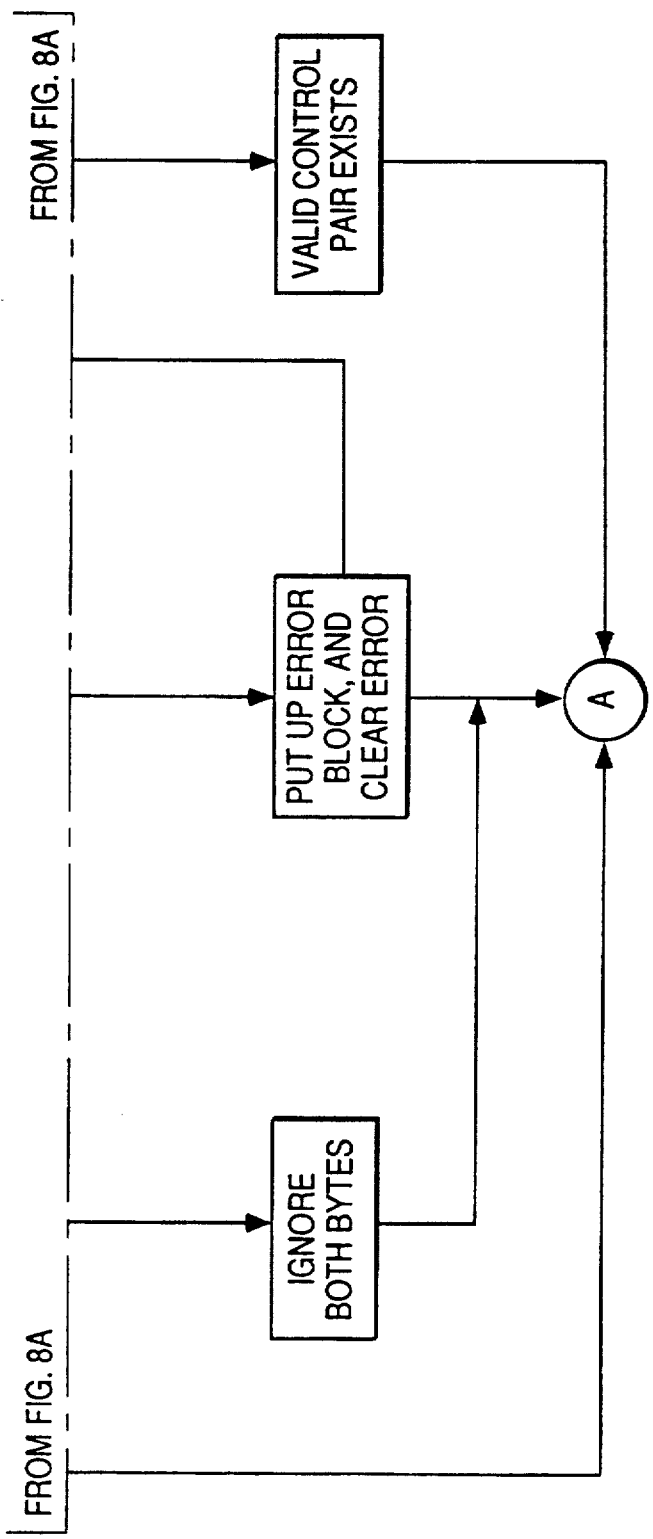
Figure 8C:
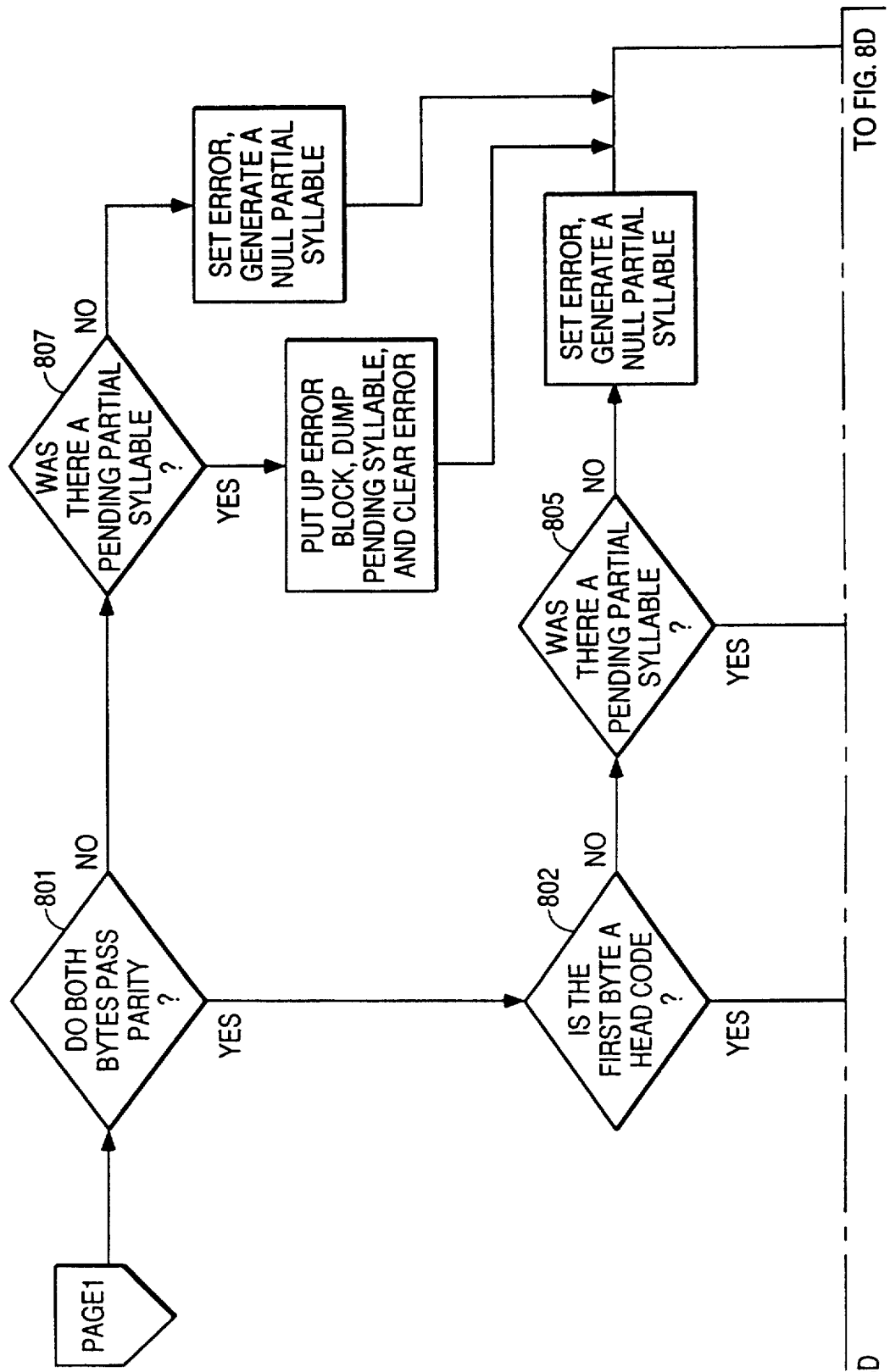
Figure 8D:
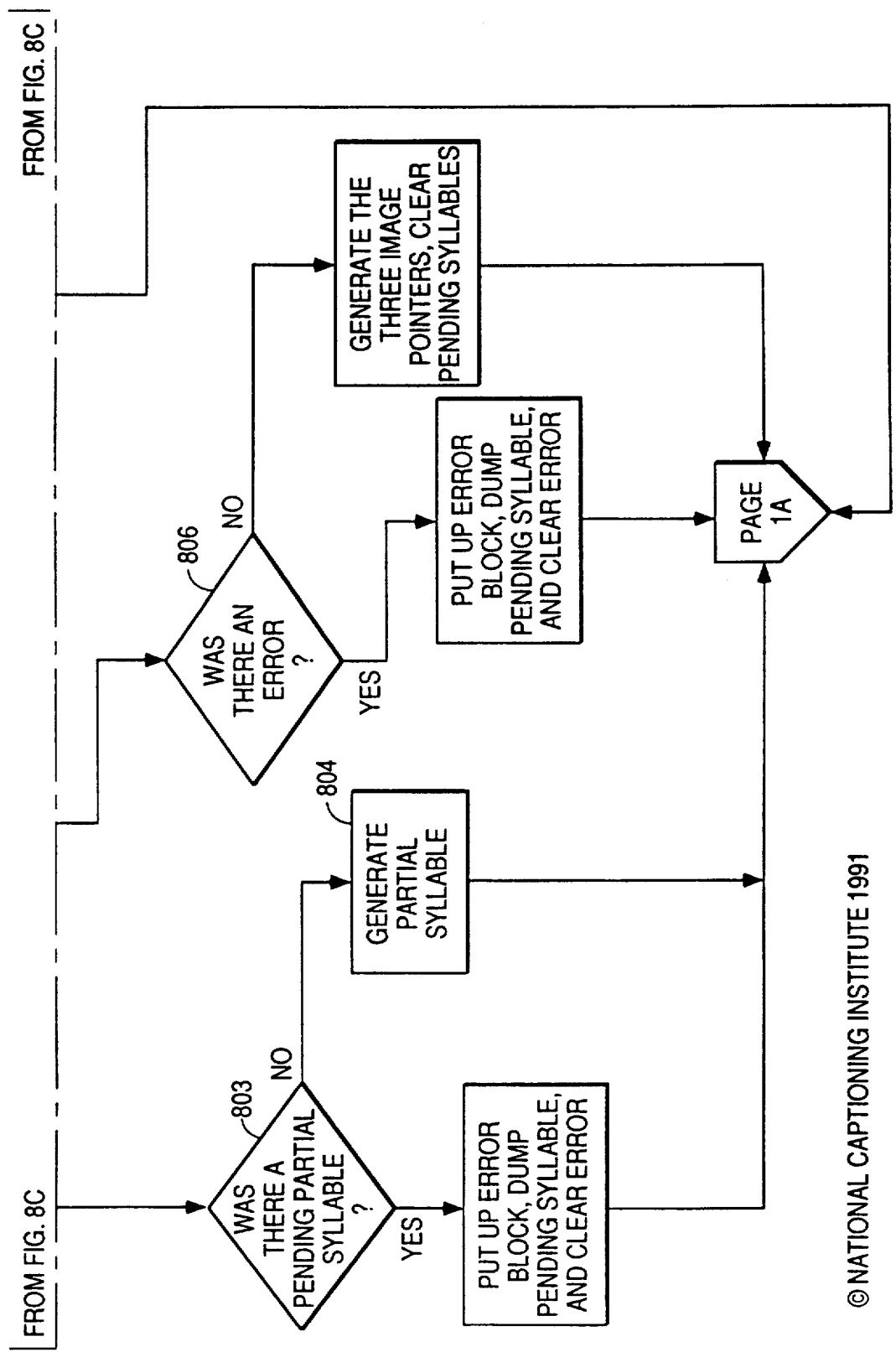

Referring first to FIG. 8A and FIG. 8B, being a continuation of FIG. 8A, and then to FIGS. 8C and 8D, there is shown a flow chart of a decoder processor algorithm for receiving the two bytes of character data via a particular line, such as line 21, of a television signal's vertical blanking interval. From a cold start of the decoder according to FIG. 8A at box 810, the decoder controller 109 proceeds to run initialization software. Any pending Korean syllable is cleared and any error flag is cleared. Then, at box 811, the controller 109 of FIG. 1B awaits data received from data extractor circuit 107. The first decision is whether the first byte received represents a non-printing character. For example, a head code or tail code is first distinguished from a non-printing command code from its value. If the answer is "no", then the byte is assumed to be either a head code or a tail code of a printable character. FIGS. 8C and 8D are then entered. Referring first to FIG. 8C, decision boxes comprising the path 801 through 804 show an error-free path for receiving the two printable character bytes comprising a head code and a first tail code 0. In this scenario, the decoder processor first checks parity and having determined that parity is passed, decodes the received data bytes by stripping parity from the received data. Having passed parity, the first byte is regarded for the characteristics of a head code. Once it is determined that the received data relates to printable characters, the head code is distinguished from the tail codes, for example, by predetermined bit position determination as per FIG. 3 (a 10 in respective bit positions 6 and 7, for example, where a tail code has a 1 in bit position 7).

Assuming the first byte of the two bytes received is determined to be a head code of a printable character or letter component, the flowchart moves from box 802 to box 803. Box 803 asks if there is a pending partial syllable. If this is a head code, tail code 0 transmission, there should be no pending partial syllable condition, therefore box 804 should be entered. Appropriate pointer registers of display random access memory 110 can then be loaded, following FIG. 3, with received data. At this point in time, a partial syllable is received in a register for pointer 0 of display RAM 110 and a partial syllable pending flag is set for reading, for example, at the next entry of box 803. Also the sixth and seventh bit positions of registers for pointers 1 and 2 respectively are set in display RAM 110 at this time.

Assuming that at box 803 there is a pending partial syllable flag stored in memory, then an error block is put up, the pending partial syllable is dumped because it is presumed to have been received in error and then the error cleared. An error block display most conveniently comprises a character that appears as a square subsuming the character cell.

Now, if the first data byte received is not a head code of a printable character, then it is assumed that it must be tail code 1. Also, the second received data byte must be tail code 2. Consequently, box 805 is entered from the "no" output path of box 802. Now, there should be a pending partial syllable stored in display RAM 110, i.e. pointer 0 should be complete. Consequently, following the "yes" path from box 805 to FIG. 8D, the next question at box 806 asks if there was an error. Of course, if there was no error flag set, then, the pointers 1 and 2 can be completed in display RAM 110. On the other hand, if there was an error, the same actions are taken as before, namely, put up an error block, dump the pending partial syllable and clear the error. Once the three pointers are generated and stored in display RAM 110, they are appropriately clocked out of display RAM 110 to uniquely point to a Korean letter component or Latin alphabet based character of character ROM 111 by timing circuit 106.

Now, if in FIG. 8C, from box 801, the bytes do not pass parity, they are deemed unusable. At box 807, the question is asked if there was a pending partial syllable, and if there was, the same action is taken, i.e., to put up an error block, dump the pending partial syllable and clear the error. If there is no pending partial syllable, the error flag is set and a null partial syllable is generated for display. Similarly, at the output of box 805, if there is no pending partial syllable, the error flag is set and a null partial syllable generated for display.

Now, referring again to FIG. 8A, if at box 812, the received byte is determined to be a non-printing character, the path follows to box 813. There should be no pending partial syllable preceding transmission of a non-printing character, even a mid-row code. Thus, if the answer at box 813 is yes, the action is taken to put up an error block, dump the pending syllable and clear the error, if set. If there is no pending partial syllable at box 813, the second byte is examined for parity at box 814, the first byte at 815, and, if they both pass parity, the data, stripped of parity, comprising the non-printing character is further examined at box 816 to fall within the range 10h to 1Fh. If the data is not in the prohibited range, then a valid control pair exists. If byte two fails parity, both bytes are ignored. If byte two passes but byte one does not, an error block is put up. The circle A of FIG. 8B represents a return to circle A of FIG. 8A and to box 811, awaiting the next data byte pair from data extractor 107.

FIG. 10 shows representative examples of captioning in English and Korean on a typical television display according to the present invention. The English characters are displayed in smaller size, typically ½ inch per the prior art, while Korean characters may be as large as ¾ inch, because of the standard resolution presumed for today's television sets. With the advent of so-called enhanced and especially high definition television, it will be possible to somewhat reduce the size of Korean captions, for example back to ½ inch in height. Furthermore, while the present invention has been described in terms of television transmission, the principles of the present invention are likewise applicable to video telecommunications transmission and associated display devices. Furthermore, the present invention may comprise a portion of a separate decoder device such as the caption decoder of FIG. 1A or be built into a television or audio/video telecommunications device.

Thus, there has been shown and described a method and apparatus for providing closed captioning, text and other services in two languages which meets the objectives of the invention which should only be deemed to be limited by the scope of the claims which follow.

We claim:

1. In decoder apparatus for decoding data encoded on particular horizontal lines of a vertical blanking interval of a composite video signal, a method for decoding the encoded data characterized by the steps of receiving the encoded data as a serial data stream of data frames, each data frame comprising a synchronization field and two data bytes.

retrieving data packets from the data frames, decoding the data packets, each data packet comprising a plurality of data bytes, the data packets indicated by particular bit indications appearing in one of the plurality of bytes of each data packet, storing a plurality of letter components in memory for at least two languages, a first language having the Roman alphabet and a second language having a syllabic alphabet, determining if the data packet represents a non-printable character, and mapping remaining bit positions of the data packet for a printable character into a number of letter component pointer bytes less than or equal to the number of bytes comprising the data packets, the letter component pointer bytes for pointing to one of a Roman alphabet letter or a syllabic alphabet letter component in memory for display.

2. A method according to claim 1 wherein each data packet comprises one head code and two tail codes.

3. A method according to claim 1 further comprising the step of generating one or more letter blocks for display, wherein if the letter component pointer bytes point to a syllabic alphabet, one letter block is formed from two or more letter components, but if the letter component pointer bytes point to the Roman alphabet, one or more letter blocks are formed, each letter block corresponding to a single letter component pointer byte.

4. A method according to claim 3 further comprising the step of displaying a syllabic language syllable approximately three quarter inch in height on a standard resolution television screen having approximately a 19 inch diagonal screen.

5. A method according to claim 3 wherein if the letter component pointer bytes point to a syllabic alphabet, the one letter block is formed by overlaying the two or more letter components.

6. A method according to claim 1 further comprising the step of evaluating whether a syllabic or non-syllabic mode has been selected for the decoder apparatus, and if the syllabic mode has been selected, mapping the remaining bit positions of the data packet into letter component pointer bytes for pointing to a syllabic alphabet, and if the syllabic mode has not been selected, mapping the remaining bit positions of the data packet into the Roman alphabet.

7. A method according to claim 1 further comprising the initial step of counting lines to determine one of two fields, each field representing a different language channel.

8. In decoder apparatus for decoding encoded data received on particular horizontal lines of a vertical blanking interval of a composite video signal, a method for decoding the encoded data characterized by the steps of decoding data packets, each data packet comprising one head code and three tail codes, the data packets indicated by particular bit indications appearing in the head code of each data packet, storing a plurality of letter components in memory for at least two languages, a first language having the Roman alphabet and a second language having a syllabic alphabet, determining if the data packet represents a non-printable character, and mapping remaining bit positions of the data packet for a printable character into a number of letter component pointer bytes less than or equal to the number of bytes comprising the data packets, the letter component pointer bytes for pointing to a Roman alphabet letter or a syllabic alphabet letter component in memory for display.

9. In decoder apparatus for decoding encoded data received on particular horizontal lines of a vertical blanking interval of a composite video signal, a method for decoding the encoded data characterized by the steps of decoding data packets, each data packet comprising four bytes, the data packets indicated by particular bit indications appearing in one of the four bytes of each data packet, storing a plurality of letter components in memory for at least two languages, a first language having the Roman alphabet and a second language having a syllabic alphabet, determining if the data packet represents a non-printable character, and mapping remaining bit positions of the data packet for a printable character into a number of letter component pointer bytes less than or equal to the four bytes, the letter component pointer bytes for pointing to a Roman alphabet letter or a syllabic alphabet letter component in memory for display.

10. A method according to claim 9 wherein the number of letter component bytes is three.

11. A method according to claim 8 further comprising the step of evaluating at least two predetermined bit positions of each byte of the data packet.

12. A method according to claim 11 wherein the predetermined bit positions of each byte of the data packet comprise no more than two predetermined bit positions.

13. A method according to claim 11 wherein each byte of each data packet comprises eight bits numbered 0 through 7 and the predetermined bit positions comprise at least bit position 6.

14. Apparatus for decoding encoded data received on particular horizontal lines of a vertical blanking interval of a composite video signal, the apparatus comprising a data extractor for extracting the encoded data from the particular horizontal lines of the vertical blanking interval and outputting the extracted data, a closed caption data controller, responsive to the data extractor, for stripping parity from the received data, for determining if the data comprises a printable character, and for outputting pointer data, a display random access memory having a plurality of pointer registers responsive to the closed caption data controller, and a character memory, responsive to the display random access memory, for outputting selected character data, the apparatus characterized in that the closed caption data processor further determines the identity of a head code or a tail code of printable character data from predetermined bit positions of the received printable character data, the printable character data representing a syllabic character or a Roman alphabet character and comprising a first plurality of bytes, the first plurality of bytes of printable character data being translated into a lesser number of letter component pointer bytes and the display random access memory stores letter component pointer data for uniquely pointing to a syllabic character letter component in the character memory.

15. The apparatus according to claim 14 further characterized by a closed caption overlay circuit for overlaying a plurality of letter components output from the character memory to replace input video picture data, the remaining video picture data and the overlaid letter components being output for display on an associated screen.

16. The apparatus according to claim 15 further characterized in that a plurality of overlaid letter components output from the closed caption overlay circuit comprise a syllabic character for display.

17. The apparatus according to claim 14 further characterized in that the character memory comprises memory for storing display data for approximately three hundred twenty-seven letter components.

18. The apparatus according to claim 16 further characterized in that the overlaid letter components comprise a letter block having a size of 10×16, each letter component being identified by predetermined starting coordinates and predetermined dimensions within the letter block.

19. The apparatus according to claim 14 wherein the first plurality of printable character data bytes comprise a head code and three tail codes.

20. A method as in claim 8, wherein the second language is Korean.

21. A method as in claim 9, wherein the second language is Korean.

22. In decoder apparatus for decoding data encoded on particular horizontal lines of a vertical blanking interval of a composite video signal, a method for decoding the encoded data characterized by the steps of
receiving the encoded data as a serial data stream of data frames, each data frame comprising a synchronization field and two data bytes,
retrieving data packets from the data frames,
decodeing the data packets, each data packet comprising a plurality of data bytes, the data packets indicated by particular bit indications appearing in one of the plurality of bytes of each data packet,
storing a plurality of letter components in memory for a first language having a syllabic alphabet,
mapping remaining bit positions of each data packet into a number of letter component pointer bytes less than or equal to the number of bytes comprising each data packet, the letter component pointer bytes for pointing to two or more letter components in memory for display,
retrieving the two or more letter components corresponding to the letter component pointer bytes from the memory, and
creating a letter block by overlaying the two or more retrieved letter components.

23. A method as in claim 22 further comprising the step of determining, prior to the step of mapping remaining bit positions of each data packet into letter component pointer bytes, whether the data packet represents a non-printable character.

24. A method as in claim 22 wherein the step of storing a plurality of letter components further includes storing letter components for a second language having a Roman alphabet in the memory, and further including the step of:
determining whether the letter component pointer bytes point to a Roman or a syllabic alphabet, and, if the letter component pointer bytes point to a Roman alphabet, creating a letter block for each of the two or more letter components instead of overlaying the two or more letter components.

25. A method as in claim 22, wherein the first language is Korean.

26. A method as in claim 22, wherein the number of different letter blocks created by the overlaying of the two or more retrieved letter components exceeds the number of letter components.

27. A method as in claim 22, wherein the number of letter components retrieved from memory and the number of letter components overlaid to create the letter block is three.

28. A method according to claim 1 wherein the number of bytes of each data packet is three.

* * * * *